US008588516B2

(12) United States Patent
Nagasaka et al.

(10) Patent No.: US 8,588,516 B2
(45) Date of Patent: Nov. 19, 2013

(54) INTERPOLATION IMAGE GENERATION APPARATUS, RECONSTRUCTED IMAGE GENERATION APPARATUS, METHOD OF GENERATING INTERPOLATION IMAGE, AND COMPUTER-READABLE RECORDING MEDIUM STORING PROGRAM

(75) Inventors: Tomoaki Nagasaka, Koganei (JP); Kouichi Nakagome, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/606,610

(22) Filed: Sep. 7, 2012

(65) Prior Publication Data
US 2013/0064453 A1 Mar. 14, 2013

(30) Foreign Application Priority Data
Sep. 8, 2011 (JP) ................................. 2011-196577

(51) Int. Cl.
*G06K 9/00* (2006.01)
(52) U.S. Cl.
USPC ........................................................ 382/154
(58) Field of Classification Search
None
See application file for complete search history.

(56) References Cited

U.S. PATENT DOCUMENTS

| 5,714,997 A * | 2/1998 | Anderson ........................ 348/39 |
| 2007/0230944 A1* | 10/2007 | Georgiev ........................ 396/322 |
| 2008/0089428 A1* | 4/2008 | Nakamura et al. ........ 375/240.26 |
| 2011/0199458 A1* | 8/2011 | Hayasaka et al. ............... 348/43 |
| 2011/0267348 A1* | 11/2011 | Lin et al. ........................ 345/426 |
| 2013/0016897 A1* | 1/2013 | Cho et al. ....................... 382/154 |

FOREIGN PATENT DOCUMENTS

| JP | 09-101482 A | 4/1997 |
| JP | 2009-003507 A | 1/2009 |
| JP | 2009-165115 A | 7/2009 |
| JP | 2009-532993 A | 9/2009 |

* cited by examiner

*Primary Examiner* — Barry Drennan
(74) *Attorney, Agent, or Firm* — Holtz, Holtz, Goodman & Chick, PC

(57) ABSTRACT

In an interpolation image generation apparatus, an input unit acquires photographed images obtained from viewpoints and imaging setting information thereof, the EPI generation unit generates an EPI from the images, an angle estimation unit estimates an angle of a straight line to which each EPI actual pixel corresponds on the EPI, an interpolation image setting unit places an interpolation image on the EPI, a correspondence detection unit detects correspondence between an actual pixel and a pixel of the interpolation image (interpolation pixel), and the correspondence detection unit evaluates likelihood of correspondence relationship between the actual pixel and the interpolation pixel, and a pixel value addition unit adds a pixel value of the interpolation pixel on the basis of the likelihood of the correspondence relationship, thereby generating an interpolation image.

11 Claims, 20 Drawing Sheets

FIG. 8

ACTUAL PIXEL INFORMATION LIST

| ACTUAL PIXEL ID | | θ | EVALUATION VALUE IT | ... |
|---|---|---|---|---|
| ACTUAL PIXEL ARRAY ID | PIXEL NUMBER | | | |
| #01 | 1 | 0 | 1 | ... |
| #01 | 2 | 0 | 1 | ... |
| #01 | 3 | 0 | 1 | ... |
| #01 | 4 | 0 | 1 | ... |
| ... | ... | ... | ... | ... |
| #01 | 25 | 0 | 1 | ... |
| #02 | 1 | 0 | 1 | ... |
| ... | ... | ... | ... | ... |
| #02 | 10 | 30 | 1 | ... |
| ... | ... | ... | ... | ... |
| #02 | 25 | 0 | 1 | ... |
| ... | ... | ... | ... | ... |
| #04 | 12 | 0 | 2 | ... |
| #04 | 13 | NULL | NULL | |
| ... | ... | ... | ... | ... |
| #04 | 25 | 0 | 1 | ... |

FIG. 10

INTERPOLATION PIXEL LIST

| INTERPOLATION PIXEL ID | | PIXEL VALUE | NUMBER OF TIMES OF ADDITION | EVALUATION VALUE ITr | ... |
|---|---|---|---|---|---|
| INTERPOLATION PIXEL ARRAY ID | PIXEL NUMBER | | | | |
| #01 | 1 | 0.34 | 5 | 1 | ... |
| #01 | 2 | 4.2 | 3 | 1 | ... |
| #01 | 3 | 4.2 | 3 | 1 | ... |
| #01 | 4 | 20 | 4 | 2 | ... |
| ... | ... | ... | ... | ... | ... |
| #01 | 25 | NULL | 0 | NULL | ... |
| #02 | 1 | 0.34 | 5 | 2 | ... |
| ... | ... | ... | ... | ... | ... |
| #02 | 25 | NULL | NULL | NULL | ... |
| ... | ... | ... | ... | ... | ... |
| #4 | 1 | 13 | 1 | 4 | ... |
| ... | ... | ... | ... | ... | ... |
| #4 | 25 | 0 | 4 | 2 | ... |

FIG. 17A GENERATE INTERPOLATION IMAGE (FIRST STAGE) FROM ACTUAL IMAGE
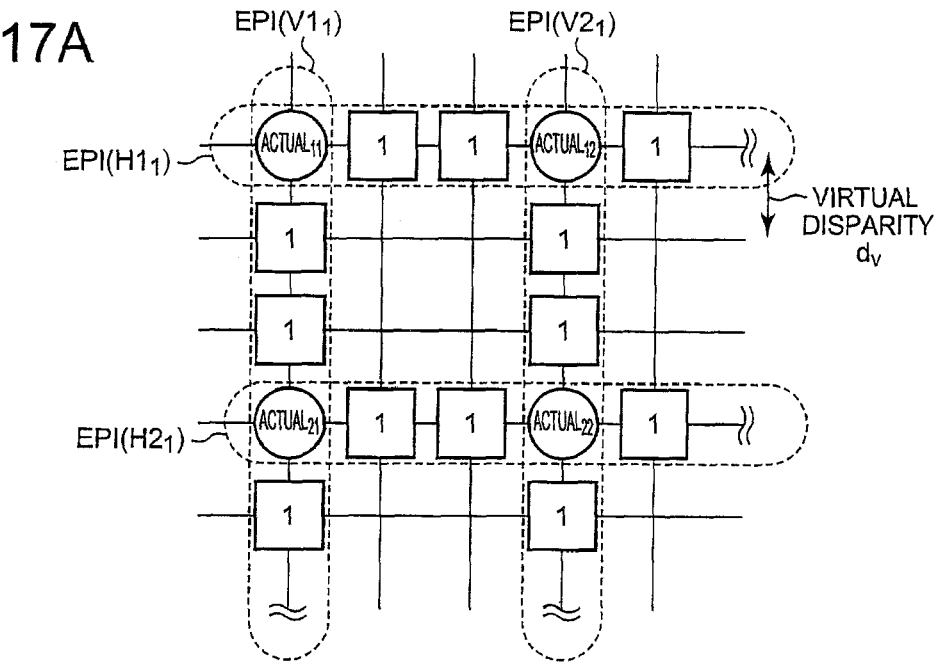
FIG. 17B GENERATE INTERPOLATION IMAGE (SECOND STAGE) FROM INTERPOLATION IMAGE (FIRST STAGE)
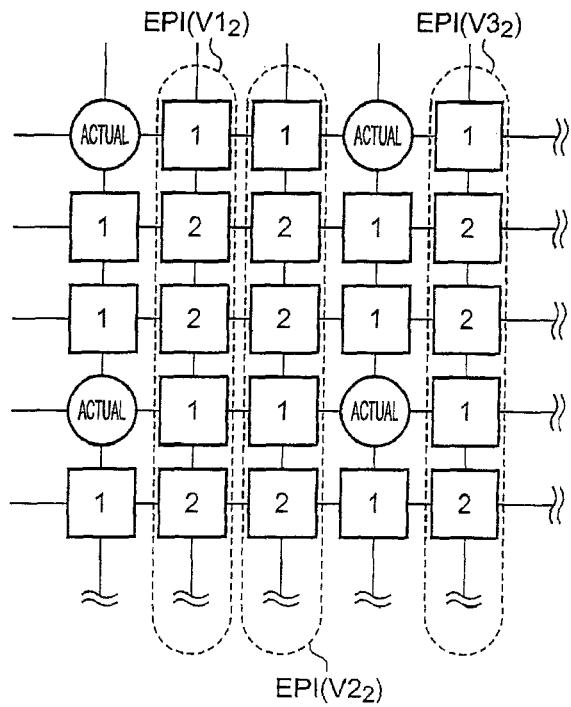

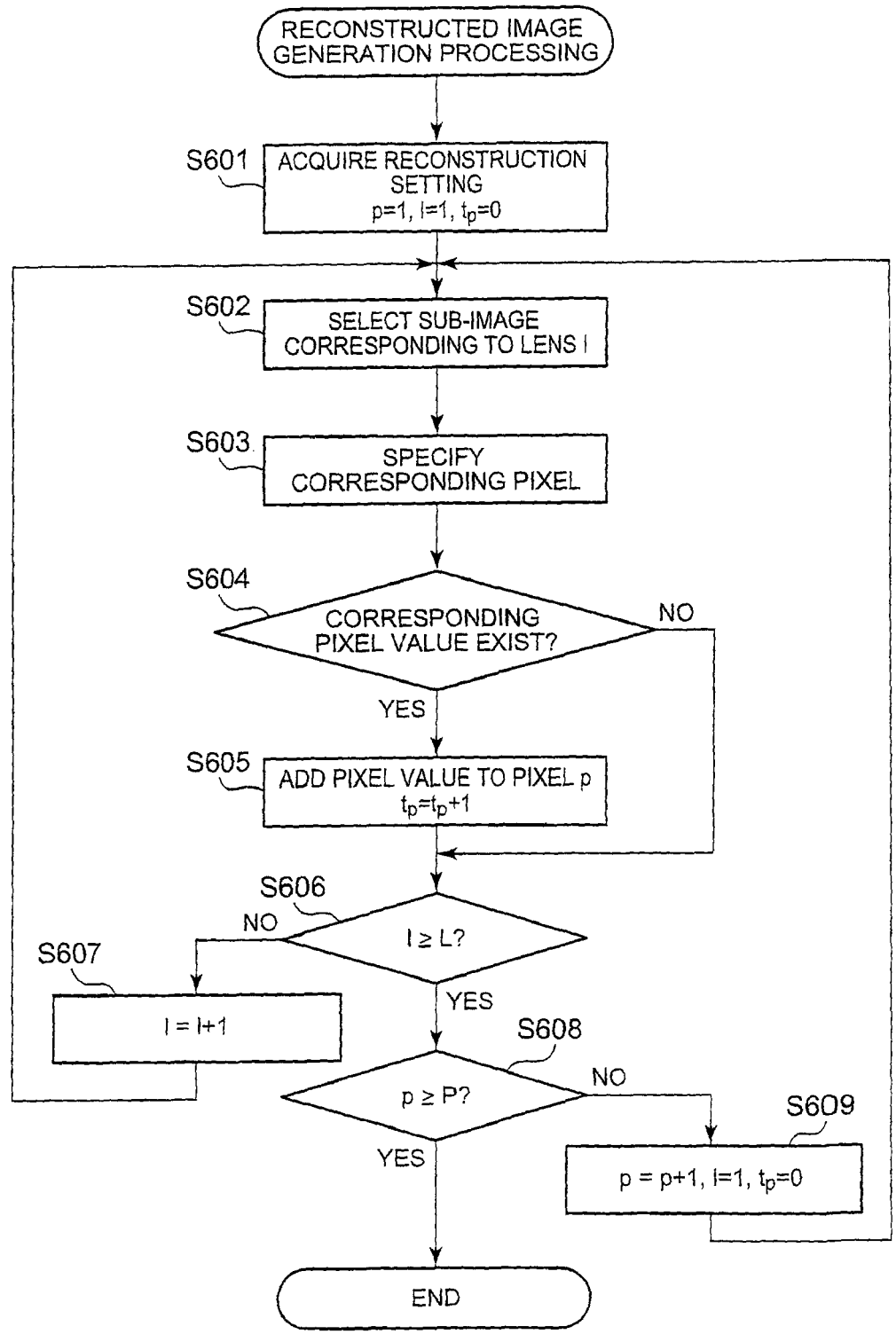

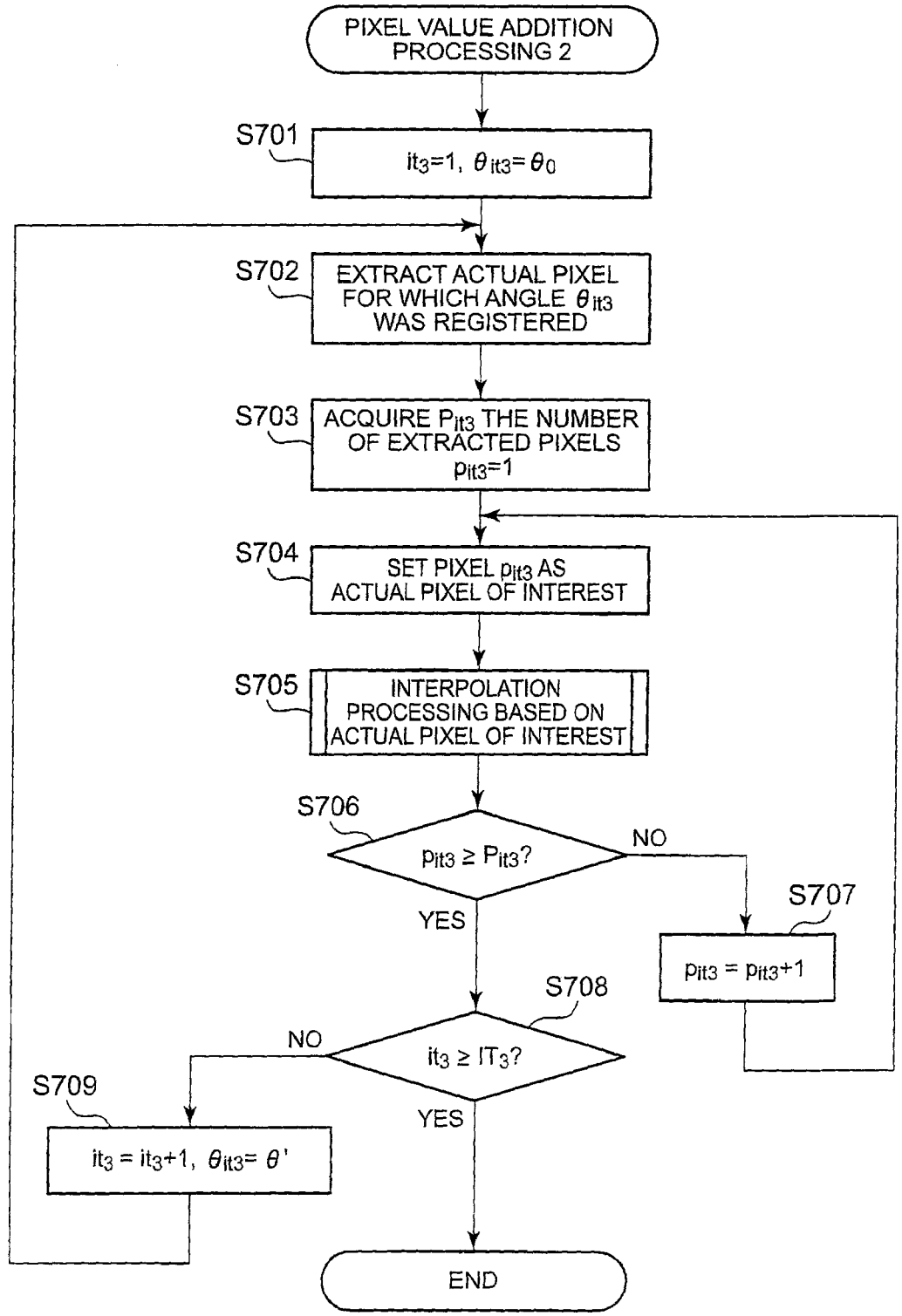

INTERPOLATION IMAGE GENERATION APPARATUS, RECONSTRUCTED IMAGE GENERATION APPARATUS, METHOD OF GENERATING INTERPOLATION IMAGE, AND COMPUTER-READABLE RECORDING MEDIUM STORING PROGRAM

CROSS-REFERENCE TO RELATED APPLICATION

This application claims the benefit of Japanese Patent Application No. 2011-196577, filed Sep. 8, 2011, the entire disclosure of which is incorporated by reference herein.

FIELD

This application relates to an art to generate an interpolation image and an art to use the interpolation image to generate a reconstructed image.

BACKGROUND

An art is known that acquires images in which an object is photographed from viewpoints, and thereby obtains the directions and amount of all light rays entering from the photographed object to a lens of a camera. A set of images in which an object is photographed from different viewpoints is called a light field image; and each of the images composing the light field image is called a sub-image.

An art is also known that acquires a light field image composed of a small number of high-resolution sub-images and reconstructs a refocused image, an image having a different depth of field, and/or the like from the acquired light field image. In the light field image, between adjacent sub-images, dead pixels occur corresponding to shift of viewpoints (disparity) where the both images were obtained. These dead pixels cause a periodic noise when a new image is reconstructed from the light field image.

SUMMARY

An interpolation image generation apparatus according to a first aspect of the present invention comprises:
  an image acquirer which acquires photographed images in which an object is photographed from viewpoints;
  an actual pixel extractor which (i) extracts, for each of actual pixels composing the photographed images, another actual pixel which is estimated to correspond to a same portion of the object, from pixels in a photographed image other than a photographed image which contains the actual pixel, as a corresponding actual pixel of the actual pixel, and (ii) calculates, for each of the actual pixels, reliability with the extracted corresponding actual pixel thereof;
  a model definer which defines a model of an interpolation image corresponding to a new viewpoint which is not included in the viewpoints;
  an interpolation pixel extractor which extracts, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;
  a determiner which determines whether each of the interpolation pixel candidates corresponds to the actual pixel based on (i) the reliability of the actual pixel or (ii) reliability of an actual pixel corresponding to an interpolation pixel adjacent to the interpolation pixel candidate; and
  an interpolation image generator which updates a pixel value of an interpolation pixel which was determined to be correspond to the actual pixel by the determiner, based on a pixel value of the actual pixel thereby to generate the interpolation image.

A reconstructed image generation apparatus according to a second aspect of the present invention comprises:
  an image acquirer which acquires photographed images obtained in such a way that an optical image of an object is formed by a main lens and the optical image is photographed using micro lenses;
  an actual pixel extractor which (i) extracts, for each of actual pixels composing the photographed images, another actual pixel which is estimated to correspond to a same portion of the object, from pixels in a photographed image other than a photographed image which contains the actual pixel, as a corresponding actual pixel of the actual pixel, and (ii) calculates, for each of the actual pixels, reliability with the extracted corresponding actual pixel thereof;
  a model definer which defines a model of an interpolation image corresponding to a new viewpoint which is not included in optical centers of the microlenses;
  an interpolation pixel extractor which extracts, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;
  a determiner which determines whether each of the interpolation pixel candidates corresponds to the actual pixel based on (i) the reliability of the actual pixel or (ii) reliability of an actual pixel corresponding to an interpolation pixel adjacent to the interpolation pixel candidate;
  an interpolation image generator which updates a pixel value of an interpolation pixel which was determined to be correspond to the actual pixel by the determiner, based on a pixel value of the actual pixel thereby to generate the interpolation image; and
  a reconstructor which reconstructs a newly-focused image from the images acquired by the image acquirer and the interpolation image generated by the interpolation image generator; and
  an image information outputter which outputs information on the reconstructed image.

A method according to a third aspect of the present invention comprises the steps of:
  acquiring photographed images in which an object is photographed from viewpoints;
  extracting, for each of actual pixels composing the photographed images, another actual pixel which is estimated to correspond to a same portion of the object, from pixels in a photographed image other than a photographed image which contains the actual pixel, as a corresponding actual pixel of the actual pixel;

calculating, for each of the actual pixels, reliability with the extracted corresponding actual pixel;

defining a model of an interpolation image corresponding to a new viewpoint which is not included in the viewpoints;

extracting, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;

determining whether each of the interpolation pixel candidates corresponds to the actual pixel based on (i) the reliability of the actual pixel or (ii) reliability of an actual pixel corresponding to an interpolation pixel adjacent to the interpolation pixel candidate; and updating a pixel value of an interpolation pixel which was determined to be correspond to the actual pixel, based on a pixel value of the actual pixel thereby to generate the interpolation image.

A non-transitory computer readable recording medium according to a fourth aspect of the present invention is a recording medium having stored thereof a program executable by a computer, the program causing the computer to realize functions of:

acquiring photographed images in which an object is photographed from viewpoints;

extracting, for each of actual pixels composing the photographed images, another actual pixel which is estimated to correspond to a same portion of the object, from pixels in a photographed image other than a photographed image which contains the actual pixel, as a corresponding actual pixel of the actual pixel;

calculating, for each of the actual pixels, reliability with the extracted corresponding actual pixel;

defining a model of an interpolation image corresponding to a new viewpoint which is not included in the viewpoints;

extracting, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;

determining whether each of the interpolation pixel candidates corresponds to the actual pixel based on (i) the reliability of the actual pixel or (ii) reliability of an actual pixel corresponding to an interpolation pixel adjacent to the interpolation pixel candidate; and updating a pixel value of an interpolation pixel which was determined to be correspond to the actual pixel, based on a pixel value of the actual pixel thereby to generate the interpolation image.

BRIEF DESCRIPTION OF THE DRAWINGS

A more complete understanding of this application can be obtained when the following detailed description is considered in conjunction with the following drawings, in which:

FIG. 8 is a table illustrating an example of an actual pixel information list according to the first embodiment;

FIG. 10 is a table illustrating an example of an interpolation pixel list according to the first embodiment;

FIGS. 17A and 17B are schematic diagrams illustrating a two-dimensional interpolation image generation processing according to the first embodiment;

FIG. 18 is a flow chart illustrating a reconstructed image generation processing according to the first embodiment;

FIG. 20 is a flow chart illustrating a pixel value addition processing according to the second embodiment of the present invention.

DETAILED DESCRIPTION

Figure 1:
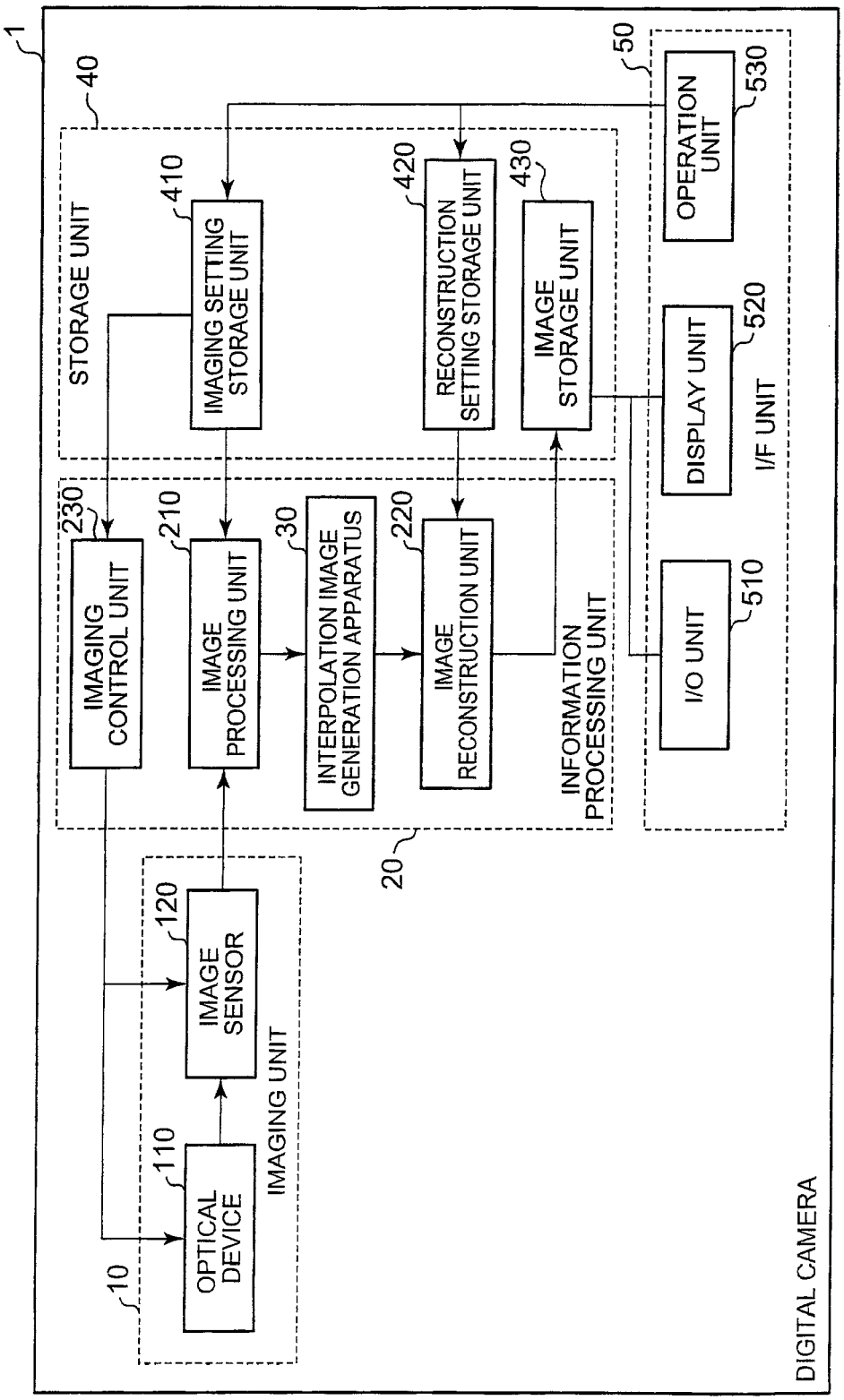
FIG. 1 is a diagram illustrating a configuration of a digital camera according to a first embodiment of the present invention.

Hereinafter, an interpolation image generation apparatus and reconstructed image generation apparatus according to embodiments for implementing the present invention will be described with reference to drawings. The same portions have the same reference numbers in the drawings.

First Embodiment

An interpolation image generation apparatus 30 according to a first embodiment is mounted in a digital camera 1 illustrated in FIG. 1. The digital camera 1 has i) a function to photograph an object to obtain an image, ii) a function to generate an interpolation image for filling in lack of information (gap) that has occurred due to viewpoint shift (disparity) among images (sub-images) obtained by photographing the same object from viewpoints and iii) a function to use the sub-images and interpolation image to generate an arbitrary reconstructed image. The interpolation image generation apparatus 30 is in charge of the function to generate an interpolation image of these functions.

The digital camera 1 is composed of an imaging unit 10, an information processing unit 20 that includes the interpolation image generation apparatus 30, a storage unit 40 and an interface unit (I/F unit) 50, as illustrated in FIG. 1. By such a configuration, the digital camera 1 obtains light ray information and displays an image representing the light ray information.

The imaging unit 10 is composed of an optical device 110 and an image sensor 120, and performs imaging operation.

Figure 2:
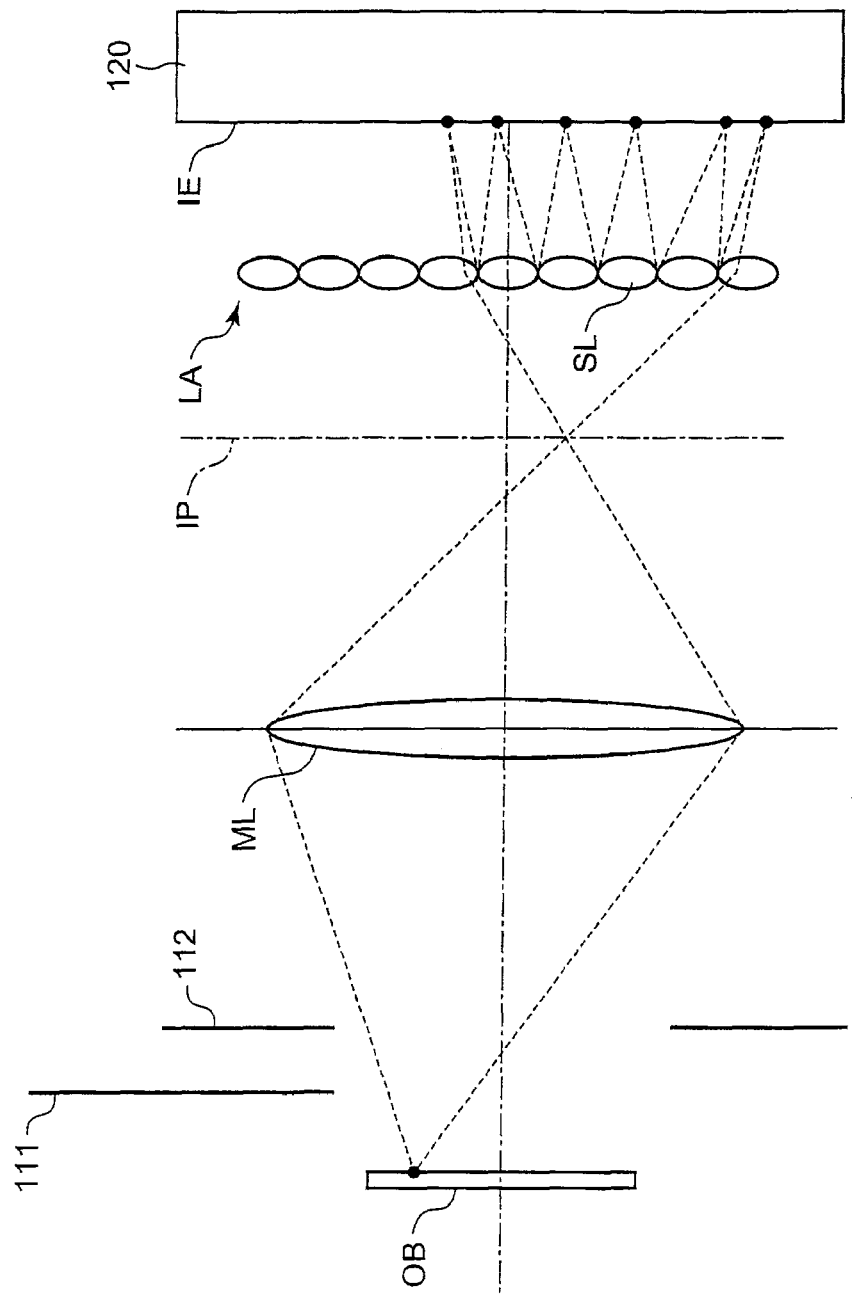
FIG. 2 is a diagram illustrating a configuration of optical formation of the digital camera according to the first embodiment.

The optical device 110 is composed of a shutter 111, aperture 112, main lens ML and micro lens array LA, as illustrated in FIG. 2, catches light rays from outside by using the main lens ML, and projects an optical image obtained by having an optical center of each sub-lens SL as a viewpoint on the image sensor 120.

The image sensor 120 converts the optical image projected by the optical device 110 to an electrical signal and transmits the electrical signal to the information processing unit 20. The image sensor 120 is composed of: an imaging element such as a charge coupled device (CCD) and a complementary metal oxide semiconductor (CMOS); and a transmission unit that transmits an electrical signal generated by the imaging element to the information processing unit 20.

The shutter 111 controls incidence and shielding of external light to the image sensor 120.

The aperture 112 controls an amount of light incident to the image sensor 120.

The main lens ML is composed of one or more convex lens(es), and focuses light of a photographed object OB to form an optical image on a virtual imaging surface IP between the main lens ML and the micro lens array LA.

The micro lens array LA is composed of M×N pieces of sub-lenses (micro lenses) SL arranged in a lattice pattern on a plane surface. The micro lens array LA forms, the optical image formed by the main lens ML on the imaging surface IP, as an optical image that is observed by having an optical center of each of the sub-lenses SL as a viewpoint, on an imaging surface IE of an image sensor composing the image sensor 120. Space formed by a plane of the main lens ML and a plane of the imaging surface IE is called a light field.

By such a configuration, the imaging unit 10 photographs a light field image that includes information of all light rays passing through the light field.

Figure 3:
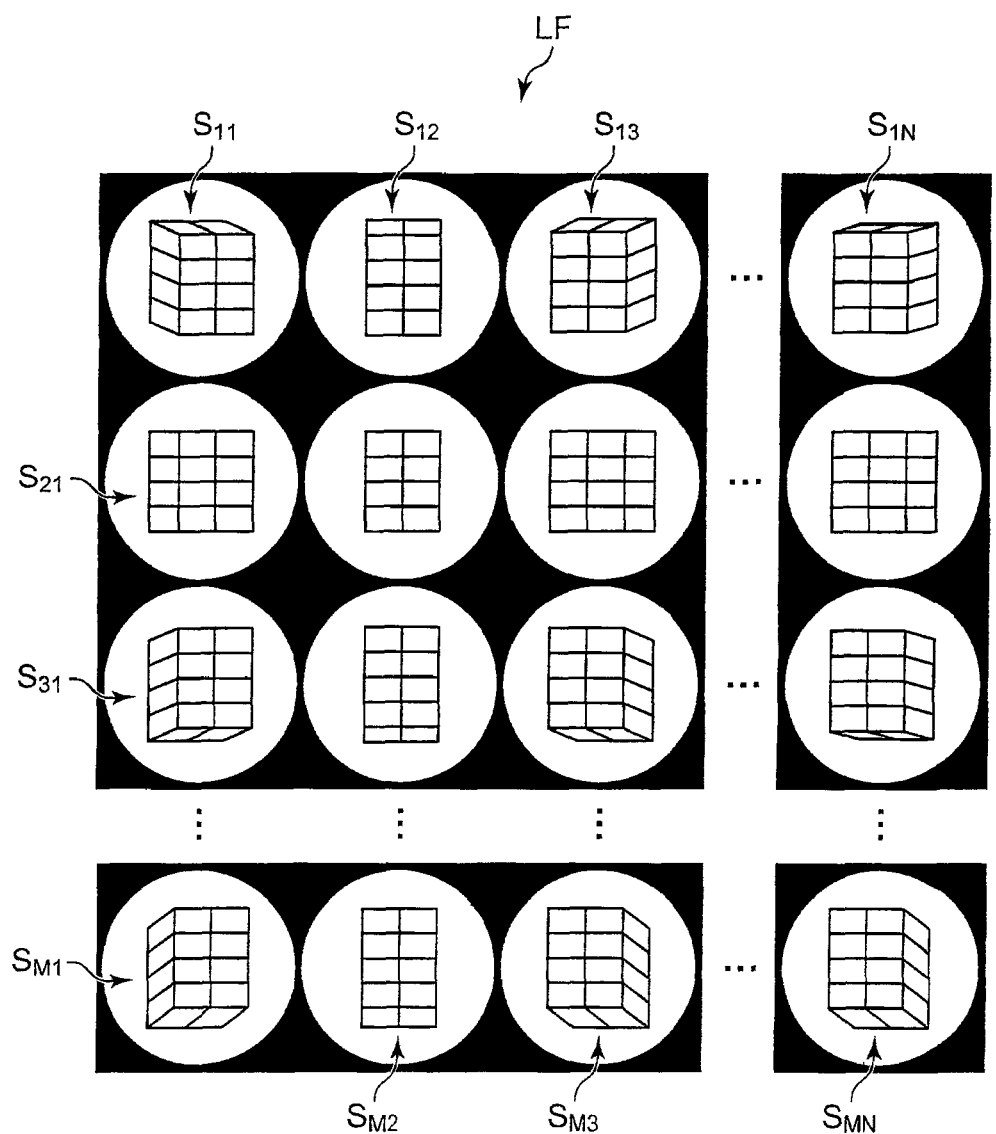
FIG. 3 is a diagram illustrating an example of a light field image according to the first embodiment.

FIG. 3 illustrates one example of a light field image LF in which a block-like object OB is photographed.

This light field image LF is composed of images (sub-images S, $S_{11}$ to $S_{MN}$), each corresponding to each of M×N pieces of sub-lenses SL arranged in a lattice pattern. For example, the upper left sub-image $S_{11}$ is an image in which the object is photographed from the upper left; and the lower right sub-image $S_{MN}$ is an image in which the object is photographed from the lower right.

Sub-images in the i-th row (sub-images in one horizontal row) $S_{i1}$ to $S_{iN}$ are stereo images obtained in such a way that sub-lenses SL arranged horizontally in the i-th row of the micro lens array LA forms an image formed by the main lens ML into the stereo images. Similarly, sub-images in the j-th column (sub-images in one vertical column) $S_{1j}$ to $S_{Mj}$ are stereo images obtained in such a way that sub-lenses SL arranged vertically in the j-th column of the micro lens array LA forms an image formed by the main lens ML into the stereo images.

Each of the sub-images S is a grayscale image, and each pixel composing the sub-images has a pixel value (scalar value).

The information processing unit 20 illustrated in FIG. 1 is physically composed of a central processing unit (CPU), random access memory (RAM), internal bus and I/O port, and functions as an image processing unit 210, interpolation image generation apparatus 30, image reconstruction unit 220 and imaging control unit 230.

The image processing unit 210 receives an electrical signal from the image sensor 120, and converts the received electrical signal into image data on the basis of imaging setting information stored in an imaging setting storage unit 410 of the storage unit 40. The image processing unit 210 transmits the image data and imaging setting information to the interpolation image generation apparatus 30.

The imaging setting information includes: information on a position of a viewpoint (an optical center of a sub-lens SL) corresponding to each of the sub-images of a light field image; information on focus of the main lens ML; information on aperture (F ratio); information on setting of the image sensor 120 and the like.

The interpolation image generation apparatus 30 uses the image data generated in the image processing unit 210 and imaging setting information read out from the storage unit 40 to generate an interpolation image that interpolates sub-images composing the image (light field image) generated by the image processing unit 210. The configuration of the interpolation image generation apparatus 30 and a method to generate an interpolation image will be described later.

The interpolation image generation apparatus 30 transmits, the image data of the generated interpolation image and interpolation image setting information as well as the image data and imaging setting information of the light field image transmitted from the image processing unit 210, to the image reconstruction unit 220.

The image reconstruction unit 220 uses the light field image and interpolation image transmitted from the interpolation image generation apparatus 30 to generate a reconstructed image conforming to reconstruction setting stored in a reconstruction setting storage unit 420 of the storage unit 40. Any method to generate a reconstructed image can be employed.

The image reconstruction unit 220 stores the generated reconstructed image in an image storage unit 430 of the storage unit 40.

The imaging control unit 230 controls the imaging unit 10 on the basis of imaging setting information stored in the imaging setting storage unit 410 of the storage unit 40.

The storage unit 40 is composed of: a main storage unit composed of a random-access memory (RAM) and/or the like; and an external storage unit composed of a nonvolatile memory such as a flash memory and a hard disc.

The main storage unit loads a control program and information stored in the external storage unit, and is used as a work area of the information processing unit 20.

The external storage unit previously stores a control program and information that have the information processing unit 20 perform processing that will be described later, and transmits these control program and information to the main storage unit according to an instruction from the information processing unit 20. The external storage unit also stores information based on processing in the information processing unit 20 and information transmitted from the interface unit 50 according to an instruction from the information processing unit 20.

The storage unit 40 is functionally composed of the imaging setting storage unit 410, reconstruction setting storage unit 420 and image storage unit 430.

The imaging setting storage unit 410 stores imaging setting information. The imaging setting information includes: information on a position of each of the sub-lenses SL composing the micro lens array LA; a distance between the micro lens array LA and the imaging surface IE of the image sensor 120; a distance between the main lens ML and the micro lens array LA; and information specifying exposure time. The imaging setting information further includes imaging parameters such as an F ratio, shutter speed, enlargement factor and/or the like that are inputted through an operation unit 530 of the interface unit 50.

The imaging setting storage unit 410 transmits the imaging parameters of the imaging setting information to the imaging control unit 230.

The imaging setting storage unit 410 transmits information on physical properties of the imaging unit 10 and imaging setting information to the image processing unit 210.

The reconstruction setting storage unit 420 stores reconstruction setting information inputted through the operation unit 530. The reconstruction setting information is composed of information on specific content of reconstruction processing and reconstruction parameters.

Here, a case where a light field image LF is reconstructed by re-focusing will be described. In this case, the reconstruction setting information includes information indicating intension to re-focus an image and information specifying a distance between a focus point of a new image and a lens.

The image storage unit 430 stores an image reconstructed by the image reconstruction unit 220. The image storage unit 430 transmits the stored image to an I/O unit 510 and display unit 520 of the interface unit 50.

The interface unit (described as I/O unit in drawings) 50 is an interface configuration between the digital camera 1 and a user of the digital camera or an external device, and is composed of the I/O unit 510, display unit 520 and operation unit 530.

The input/output unit (I/O unit) 510 is physically composed of a universal serial bus (USB) connector, video output terminal and input/output control unit. The I/O unit 510 outputs information stored in the storage unit 40 to an external computer, and transmits information from outside to the storage unit 40.

The display unit 520 is composed of a liquid crystal display unit, an organic electro luminescence (EL) display, or the like, and displays an image for inputting setting information to be stored in the imaging setting storage unit 410 or reconstruction setting storage unit 420, and an image for operating the digital camera 1. The display unit 520 displays an image stored in the image storage unit 430.

The operation unit 530 is composed of, for example, various buttons provided in the digital camera 1, a touch panel provided in the display unit 520 and a control unit that detects information on operations performed by the various buttons and touch panel and transmits the detected information to the storage unit 40 and information processing unit 20; and inputs information inputted by user operation.

Next, a configuration of the interpolation image generation apparatus 30 will be described with reference to FIGS. 4A and 4B.

Figure 4A:
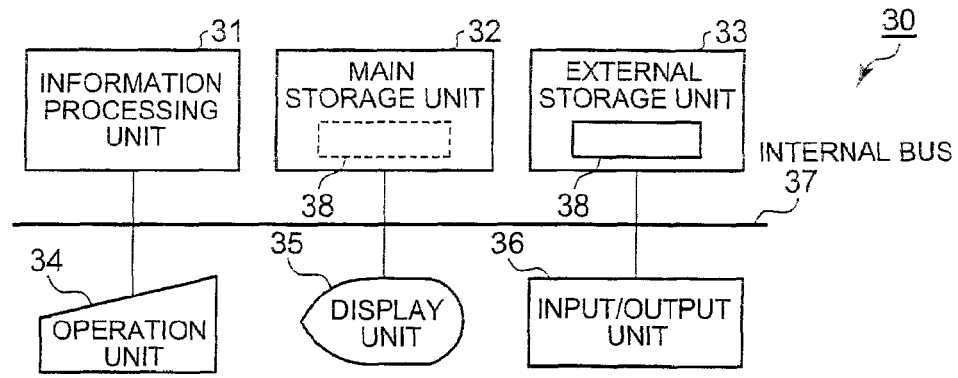
FIG. 4A is a diagram illustrating a physical configuration of an interpolation image generation apparatus according to the first embodiment.

The interpolation image generation apparatus 30 is composed of an information processing unit 31, main storage unit 32, external storage unit 33, operation unit 34, display unit 35, input/output unit 36 and internal bus 37, as illustrated in FIG. 4A.

The information processing unit 31 is composed of a central processing unit (CPU) and a random access memory (RAM).

The main storage unit 32 has the same physical configuration as that of the main storage unit of the storage unit 40. The external storage unit 33 has the same physical configuration as that of the external storage unit of the storage unit 40 and stores a program 38. The operation unit 34 has the same physical configuration as that of the operation unit 530. The display unit 35 has the same physical configuration as that of the display unit 520. The input/output unit 36 has the same physical configuration as that of the I/O unit 510. The internal bus 37 connects the main storage unit 32, external storage unit 33, operation unit 34, display unit 35 and input/output unit 36 to one another.

The main storage unit 32, external storage unit 33, operation unit 34, display unit 35, input/output unit 36 and internal bus 37 may be functional blocks realized by an internal circuit of the information processing unit 20, storage unit 40 and interface unit 50 of the digital camera 1.

The interpolation image generation apparatus 30 copies the program 38 and data stored in the external storage unit 33 to the main storage unit 32, and the information processing unit 31 uses the main storage unit 32 to run the program 38, thereby performing interpolation image generation processing that will be described later.

Figure 4B:
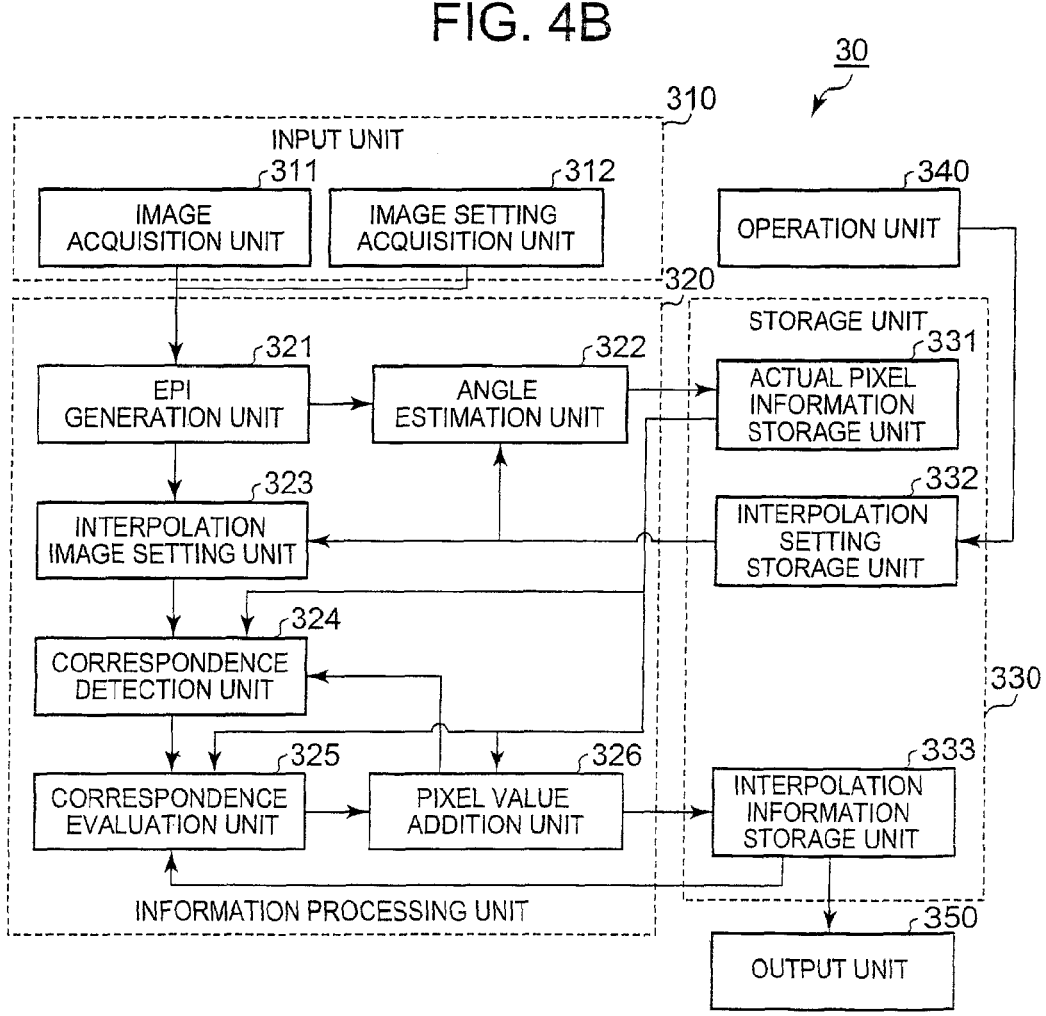
FIG. 4B is a diagram illustrating a functional configuration of the interpolation image generation apparatus according to the first embodiment.

By the above physical configuration, the interpolation image generation apparatus 30 functions as an input unit 310, information processing unit 320, storage unit 330, operation unit 340 and output unit 350, as illustrated in FIG. 4B.

The input unit 310 is composed of: the image acquisition unit 311 that acquires a light field image LF from the image processing unit 210; and an image setting acquisition unit 312 that acquires imaging setting information when the light field image LF is acquired.

The information processing unit 320 generates an interpolation image on the basis of a light field image LF acquired by the image acquisition unit 311, imaging setting information of the light field image LF acquired by the image setting acquisition unit 312, and interpolation setting stored in an interpolation setting storage unit 332. The information processing unit 320 stores the generated interpolation image together with the image acquired by the image acquisition unit 311 in an interpolation information storage unit 333 of the storage unit 330.

The storage unit 330 stores setting information stored at the time of factory shipment, input information inputted by a user through the operation unit 340, and a result of processing by the information processing unit 320. The storage unit 330 transmits information requested by the information processing unit 320 to the information processing unit 320. The storage unit 330 also transmits stored information to the output unit 350.

The information processing unit 320 performs the undermentioned processing to function as an EPI generation unit 321, angle estimation unit 322, interpolation image setting unit 323, correspondence detection unit 324 and correspondence evaluation unit 325 and pixel value addition unit 326.

When the EPI generation unit 321 receives a light field image LF from the image acquisition unit 311 of the input unit 310 and imaging setting information of the light field image LF from the image setting acquisition unit 312 of the input unit 310, respectively, the EPI generation unit 321 generates an epipolar plane image (EPI). The EPI generation unit 321 transmits the generated EPI to the angle estimation unit 322 and interpolation image setting unit 323.

An EPI that the EPI generation unit 321 generates from a light field image LF will be described with reference to FIGS. 5A to 5C.

Figure 5A:
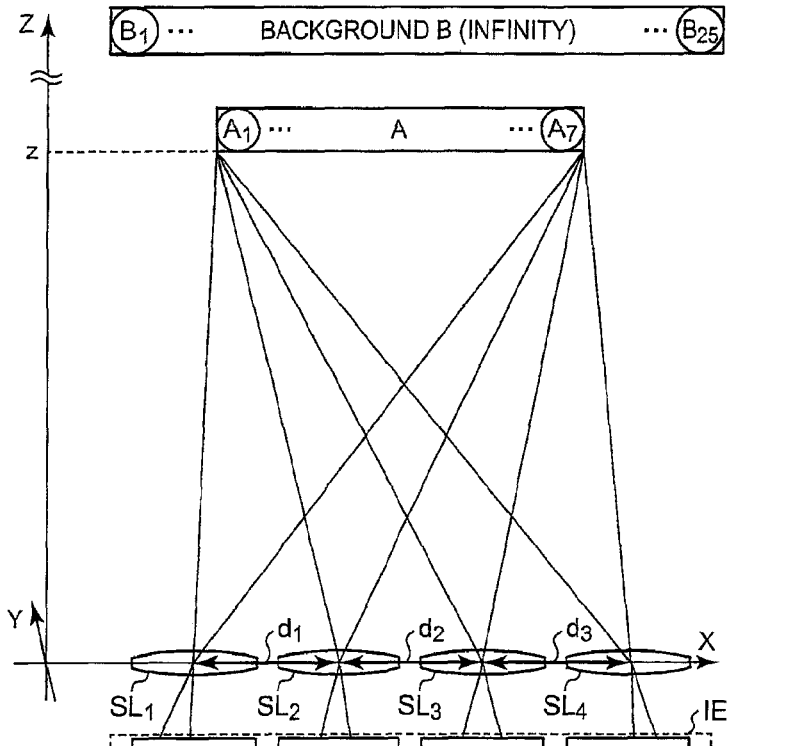
FIGS. 5A to 5C are diagrams illustrating a relationship between an actual image and an EPI according to the first embodiment.

For easier understanding, a case will be described where an EPI is generated from a light field image LF obtained in such a way that four sub-lenses ($SL_1$ to $SL_4$) arranged in a vertical (X-axis) direction are used to photograph a background B existing at infinity and an object A apart from lenses (sub-lenses) $SL_1$ to $SL_4$ by a distance z in the Z-axis direction, as illustrated in FIG. 5A.

The background B is composed of portions $B_1$ to $B_{25}$, each corresponding to each of different pixels. The object A is composed of portions $A_1$ to $A_7$, each corresponding to each of different pixels.

The sub-lenses $SL_1$ to $S_4$ form sub-images $S_1$ to $S_4$ on the imaging surface IE of the image sensor 120, respectively. In other words, each of the sub-images $S_1$ to $S_4$ is an image in which an object is photographed by having an optical center of each of the sub-lenses $SL_1$ to $SL_4$ as a viewpoint.

Figure 5B:
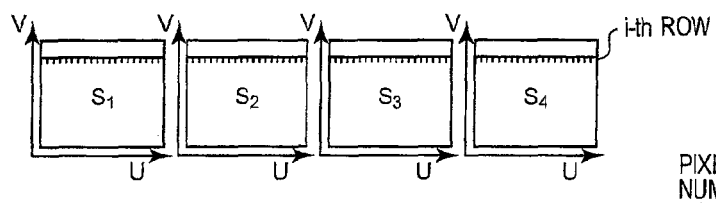

Each of the sub-images $S_1$ to $S_4$ is configured in a lattice fashion such that v pieces of pixels are arranged vertically (V-axis direction), and u (here, 25) pieces of pixels are arranged horizontally (U-axis direction), as illustrated in FIG. 5B. The optical centers of the sub-lenses $SL_1$ to $SL_4$ are apart from each other by a distance (disparity) $d_1$ to $d_3$. Here, disparities $d_1$ to $d_3$ have the same value d. The disparity value d is decided according to a physical configuration of the micro lens array LA where the micro lens array LA is used for photographing. The disparity value d is included in imaging setting information.

The vertical (V-axis) direction of the sub-images $S_1$ to $S_4$ corresponds to Y-axis direction in an object space; and the horizontal (U-axis) direction thereof corresponds to X-axis direction in the object space. Each pixel array of the same row (for example, i-th row) of the sub-images $S_1$ to $S_4$ corresponds to the same epipolar plane. An epipolar plane is a plane formed by three points: a point of interest of an object to be photographed, and two viewpoints for photographing the object.

An image in which pixel arrays corresponding to an epipolar plane are arranged in order of corresponding viewpoints is an EPI. Hereinafter, each array of an actually-photographed image (actual image) composing an EPI is called an actual pixel array, and each pixel of the actual pixel array is called an actual pixel. In an example illustrated in FIGS. 5A to 5C, v pieces of EPIs can be defined by the number of pixel arrays in V-axis direction of the sub images $S_1$ to $S_4$.

Figure 5C:
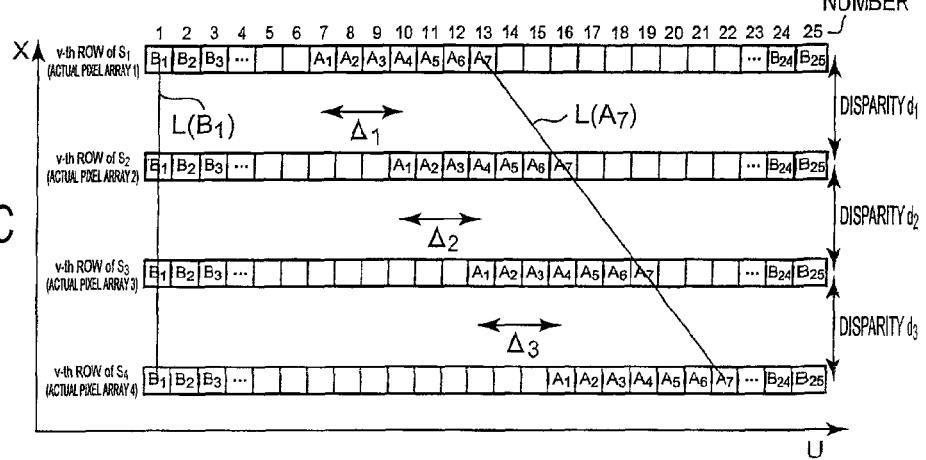

FIG. 5C illustrates an EPI generated by arranging respective pixel arrays in i-th row of the sub-image $S_1$ to $S_4$, in FIG. 5B in order.

Here, the vertical direction (X-axis in FIG. 5C) of the EPI corresponds to X-axis in the object space (FIG. 5A); and the horizontal direction (U-axis in FIG. 5B) of the EPI corresponds to the U-axis in the sub-images (FIG. 5A). Pixel numbers (1 to 25, here) are assigned to pixels composing each column in the U-axis direction of the EPI. Respective rows of the EPI are arranged in X-axis direction at intervals according to corresponding disparities $d_1$ to $d_3$. Where disparities $d_1$ to $d_3$ are approximately the same, the rows may be arranged in narrower space therebetween.

Within each pixel of the EPI in FIG. 5C, a sign indicating a portion of a photographed object corresponding to the pixel ($A_1$ to $A_7$, $B_1$ to $B_{25}$) is described.

For example, a pixel corresponding to a portion $A_1$ of the object A appears in a pixel with pixel number 7 in an actual pixel array 1 ($R_1$), and appears in a pixel with pixel number 10 in an actual pixel array 2 ($R_2$). A difference $\Delta_1$ in pixel number between the actual pixel array 1 and the actual pixel array 2 is three. A difference $\Delta$ ($\Delta_1$ to $\Delta_3$) in pixel number between respective rows of the EPI (between actual pixel array 1 ($R_1$) and actual pixel array 2 ($R_2$), between actual pixel array 2 ($R_2$) and actual pixel array 3 ($R_3$), between actual pixel array 3 ($R_3$) and actual pixel array 4 ($R_4$)) is called an EPI disparity of the photographed object. Where disparities d ($=d_1=d_2=d_3$) are equal, EPI disparities ($\Delta_1$ to $\Delta_3$) are also equal.

Since the actual pixel array 1 ($R_1$) to the actual pixel array 4 ($R_4$) are arranged at intervals according to disparities $d_1$ to $d_3$ between corresponding sub-lenses $SL_1$ to $SL_4$, pixels of the EPI corresponding to the same photographed object align in a straight line on the EPI.

Specifically, for example, pixels corresponding to the rightmost portion ($A_7$) of the object A align on a straight line L ($A_7$) in FIG. 5C. The straight line L ($A_7$) is called the EPI straight line of a photographed object portion $A_7$.

An EPI straight line makes a larger angle relative to X-axis of the EPI when its corresponding object to be photographed is closer. That is because the closer the object to be photographed (for example, $A_7$) becomes, the more the angle of light entering from the object to be photographed ($A_7$) to the lenses L1 to L4 changes due to disparities $d_1$ to $d_3$, thereby having corresponding pixel positions (pixel number) largely shift to the U-axis direction to one another.

Meanwhile, for example, where the object to be photographed is far from the lenses $L_1$ to $L_4$ as the background B, light rays enter into the lenses $L_1$ to $L_4$ almost parallel to one another; as a result, corresponding pixel positions (pixel number) do not change in the U-axis direction, and are parallel to the X-axis of the EPI as an EPI straight line L ($B_1$).

An angle θ (Q) between an EPI straight line L (Q) corresponding to a point Q on an object to be photographed and X-axis is decided according to a distance $z_q$ between the point Q and the sub-lenses, a disparity d, a distance between the micro lens array LA and the imaging surface IE, a distance between imaging elements, and the like.

A large EPI disparity $\Delta$ ($=\Delta_1=\Delta_2=\Delta_3$) causes a large information gap (dead pixels) in respective rows in the EPI. These dead pixels (information gap) cause noise when an image is reconstructed. Therefore, in the present embodiment, a virtual interpolation image is generated between sub-images and arranged between actual pixel arrays in the EPI to be used for generating a reconstruction image, thereby reducing noise caused by the dead pixels.

Returning to FIG. 4B, the EPI generation unit 321 transmits the generated EPI to the angle estimation unit 322 and the interpolation image setting unit 323.

Where sub-images S are arranged in N pieces horizontally and in M pieces vertically, and each actual image thereof is composed of V pieces of pixel arrays vertically and U pieces of pixel arrays horizontally, the total pieces of the EPIs can be defined by V·M+U·N.

When the EPI generation unit 321 acquires a light field image LF composed of M·N pieces of sub-images S, the EPI generation unit 321 generates all of the above (V·M+U·N) pieces of EPIs.

When the angle estimation unit 322 receives the EPIs from the EPI generation unit 321, the angle estimation unit 322 estimates, for each actual pixel on the EPIs, an angle θ between the EPI straight line and the X-axis with the use of interpolation setting stored in the interpolation setting storage unit 332.

The interpolation setting information includes the number of interpolation images to be generated, relative positions where the interpolation images are placed, and parameters used for angle estimation and/or the like. The interpolation setting is defined by a user through the operation unit 340 and stored in the interpolation setting storage unit 332. The interpolation setting may be information previously stored in the interpolation setting storage unit 332 at the time of factory shipment.

Processing to estimate an angle θ between the EPI straight line and X-axis for an actual pixel to be crossed will be briefly described.

An actual pixel of interest is called as a pixel Pxl ($R_x$, u). $R_x$ means that an actual pixel of interest is a pixel in an actual pixel array $R_x$ (the x-th actual pixel array) and u means that an actual pixel of interest is a pixel the u-th pixel in the actual pixel array $R_x$. A straight line that passes through an actual pixel of interest Pxl ($R_x$, u) and whose angle relative to X-axis is angle θ is called Line (θ).

Figure 6:
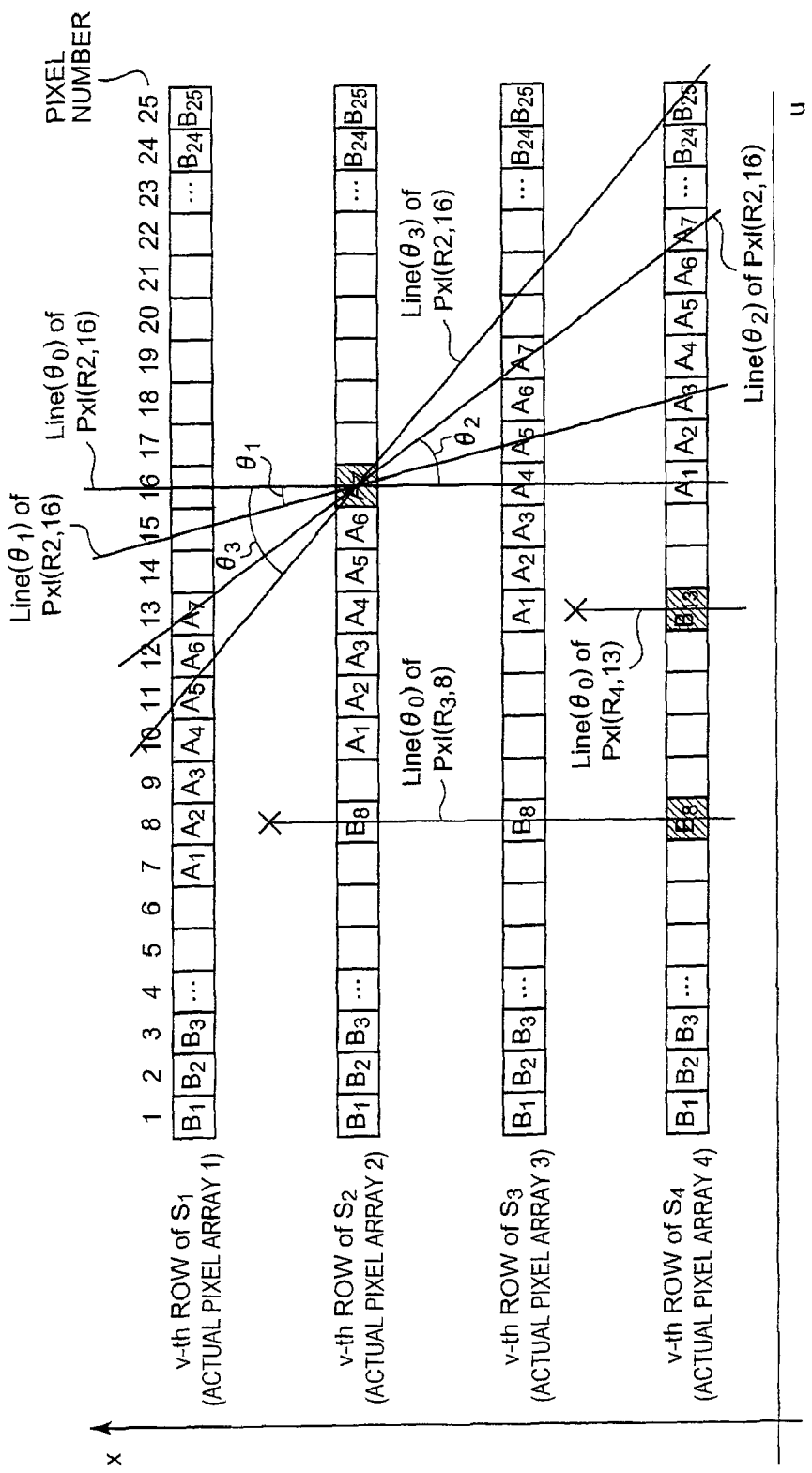
FIG. 6 is a schematic diagram illustrating a straight-line estimation processing according to the first embodiment.

FIG. 6 illustrates an example of processing to estimate an angle θ where Pxl ($R_2$, 16), which is a pixel at pixel number 16 in an actual pixel array 2 ($R_2$), is an actual pixel of interest. FIG. 6 illustrates straight lines, Lines (θ), that correspond to a plurality of θ defined for a pixel Pxl ($R_2$, 16).

Then, for actual pixels of $R_1$ to $R_4$ on the respective straight lines, Line (θ), an evaluation value C, which is the likelihood of a straight line of Pxl ($R_x$, u), Line (θ) is an EPI straight line, is calculated based on a difference between pixel values on the straight line.

An evaluation value C is calculated by Expression (1). The smaller a value of an evaluation value C (C value) is, the smaller an error of a pixel value of an actual pixel on a straight line, Line (θ) is, which indicates that the reliability of the pixel on the straight line is higher. An angle θ at which the reliability of an evaluation value C is the highest is derived, and is decided as an angle θ of an EPI straight line estimated for the actual pixel.

$$C = \frac{1}{K} \sum_{k \in EPI} |I_k - I| \quad (1)$$

In Expression (1), I is a pixel value of an actual pixel of interest, EPI is a parameter of respective pixels other than the actual pixel of interest on a Line (θ), $I_k$ is a pixel value of each pixel other than the actual pixel of interest on the straight line, and K is the number of pixels other than the actual pixel of interest on the straight line.

Calculation of an evaluation value C is not limited to use of Expression (1), and any expression can be employed in which the larger an error of a pixel value of each pixel on a straight line, Line (θ) is, the higher a value of a solution is. For example, an evaluation value C may be calculated using an expression in which square of a difference between a pixel value of an actual pixel of interest and a pixel value on the straight line is added and divided by K.

Pixels on a straight line Line (θ) are extracted according to the following processing:

(1) An intersection point Pc of Line (θ) and a center line of each pixel array is obtained.

(2) If the intersection point Pc is in intermediate point between the center of pixel A and the center of pixel B in the pixel array, a pixel whose center is closer to the intersection point Pc is selected from the pixel A and the pixel B as a pixel existing on Line (θ) in the pixel array.

(3) If the intersection point Pc is in the center of the pixel A, the pixel A is selected as a pixel existing on Line (θ) in the pixel array.

(4) If the intersection point Pc is outside a pixel array (outside pixel number 1 or pixel number 25 in an example of FIG. 6), a pixel on Line (θ) in the pixel array does not exist.

The angle estimation unit 322 illustrated in FIG. 4B sets an angle θ whose reliability of an evaluation value C is the highest to an estimated EPI straight line of the pixel, and if the C-value is less than or equal to a predetermined threshold value, registers the angle θ in an actual pixel information list that will be described later. For example, since in FIG. 6 a pixel corresponding to an object to be photographed A7 corresponding to an actual pixel of interest Pxl ($R_2$, 16) is on Line ($θ_2$), an angle $θ_2$ is registered for a pixel ($R_2$, 16).

At this time, there are some pixels whose EPI straight lines are difficult to be estimated. For example, an object to be photographed corresponding to a pixel Pxl ($R_4$, 13) in FIG. 6 is a portion $B_{13}$, of background B, illustrated in FIG. 5A. A pixel corresponding to $B_{13}$ would exist on an EPI straight line (Line (0) of Pxl ($R_4$, 16)) of an angle 0 that is parallel to X-axis if the object A did not exist.

However, since, in actual pixel arrays 1 to 3, $B_{13}$ hides in the object A, a pixel corresponding to a pixel Pxl ($R_4$, 13) does not exist in the actual pixel arrays 1 to 3. Accordingly, an EPI straight line cannot be estimated.

And, for example, an object to be photographed corresponding to a pixel Pxl ($R_4$, 8) is a portion $B_8$ of background B. A pixel corresponding to the portion $B_8$ exists on Line ($θ_0$) of Pxl ($R_4$, 8) in actual pixel arrays 2 and 3, but does not exist in an actual pixel array 1 since $B_8$ hides in the object A. Therefore, a straight line, Line (0), cannot be correctly estimated depending on a pixel value of Pxl ($R_1$, 8), and as a result, an angle θ different from an angle 0 can be registered for Pxl ($R_4$, 8).

Thus, the interpolation image generation apparatus 30 repeatedly performs estimation processing in such a way that pixels for which an estimated straight line having a high reliability has been obtained are excluded from an object to be processed in subsequent repeated estimation processing.

This processing will be described with reference to FIG. 7.

First, since, for actual pixels indicated by diagonal lines or meshed pattern, corresponding actual pixels exist in all of actual pixel arrays 1 to 4 on the EPI, an EPI straight line having a high reliability (a small C-value) can be estimated unless effects of noise are considered.

The first estimation processing is performed under the conditions that an angle θ is registered only if a C-value is less than or equal to a threshold value previously set to be a small value so as to increase reliability. As a result, an EPI straight line is estimated and an angle θ is registered only for pixels whose correspondence relationships are certain (pixels indicated by diagonal lines and pixels indicated by meshed pattern). Then, in a subsequent loop and after, actual pixels for which an angle θ have been registered is not subjected to calculation.

Next, only actual pixels for which an angle θ was not registered in the first estimation processing are used to perform the second estimation processing. In the second estimation, even if a threshold value is the same as that of the first estimation processing, since the number of pixels to be calculated in Expression (1) decreases, an angle θ can be estimated for pixels illustrated in ellipses. For example, if a straight line for Pxl ($R_4$, 7) is estimated in the second estimation processing, a pixel value of Pxl ($R_1$, 7) is not calculated. Therefore, since a difference between a pixel value of Pxl ($R_4$, 7) and a pixel value of Pxl ($R_1$, 7) is not added in Expression (1), an angle 0 can be estimated without an effect of a pixel value of Pxl ($R_1$, 7) to have a right EPI straight line to be established.

Hereinafter, the same processing will be performed in series using only actual pixels for which an angle θ has not been registered.

In the present embodiment, an evaluation value C is calculated for each straight line, and a straight line having a small evaluation value C is set to be an estimated EPI straight line, thereby enabling an actual pixel corresponding to each actual pixel to be simply estimated on an EPI. In addition, by excluding a pixel for which an angle θ has been registered in a subsequent and later angle θ estimation processing, an angle θ can be registered in series for a pixel corresponding to an object to be photographed whose correspondence relation is certain (not shielded by occlusion), and a correspondence relationship of a pixel corresponding to an object to be photographed that is shielded by occlusion can be estimated without an effect of a pixel corresponding to a shielding object.

The number of times of estimation processing performed until an angle θ is registered allows for evaluation of what extent an object to be photographed corresponding to the pixel is shielded by occlusion. A pixel for which an angle θ is registered after fewer times of processing is evaluated to have lower possibility that an object to be photographed corresponding to the pixel is shielded by occlusion. Then, the number of times of processing (iteration) performed until an angle θ, iteration number, is registered is stored as an evaluation value IT of an angle θ of a pixel in association with the pixel.

Figure 7:
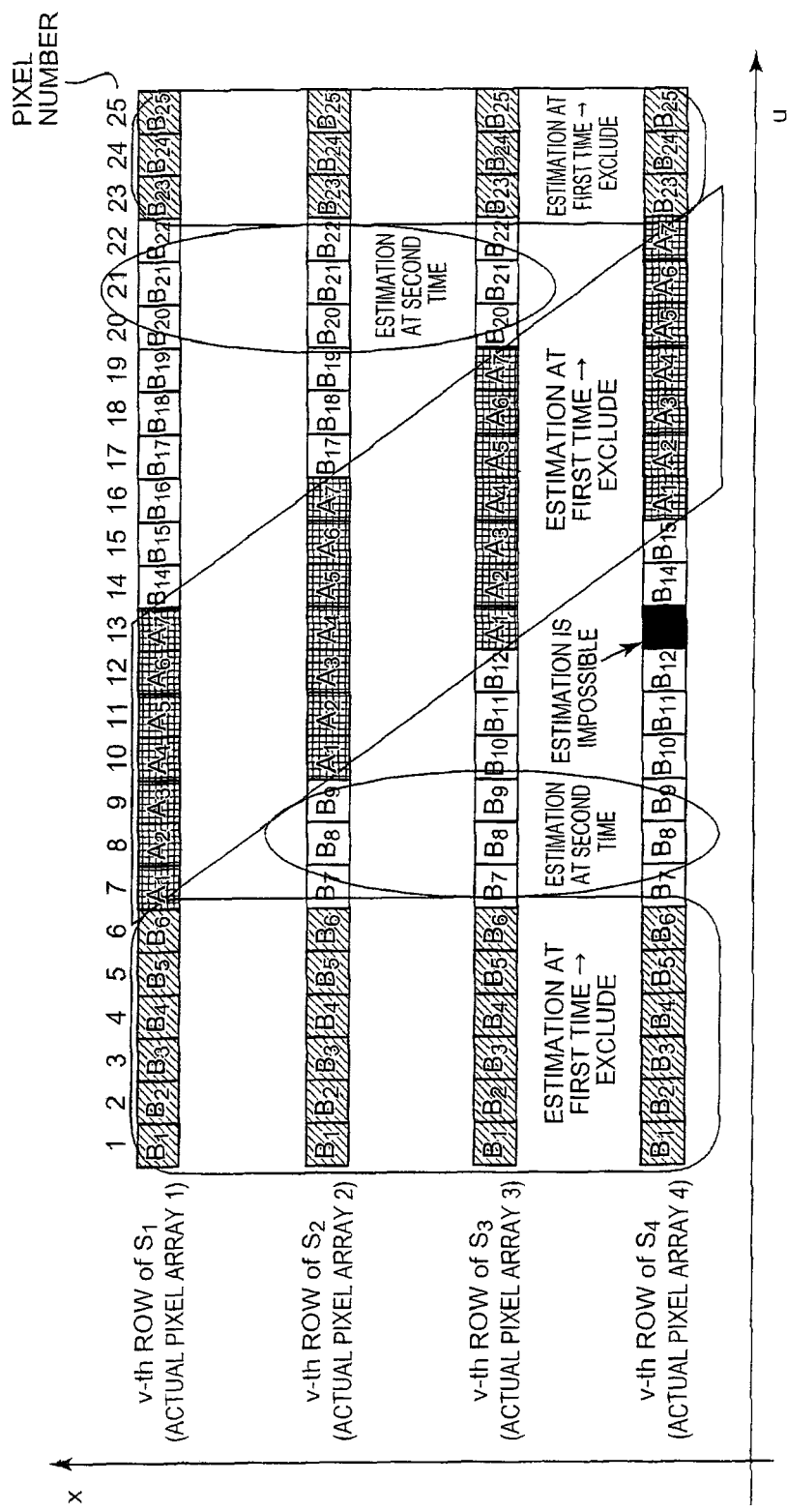
FIG. 7 is a schematic diagram illustrating a straight-line estimation processing according to the first embodiment.

There are some pixels, as Pxl ($R_4$, 13) blackened in FIG. 7, that do not have corresponding pixels and for which an angle cannot be estimated (an EPI straight line having a C-value less than a predetermined threshold value (a maximum value of a threshold value) cannot be estimated). For such pixels, an angle θ is stored as a null value (NULL). The same applies to a case where a straight line whose C-value is less than a threshold value cannot be detected due to noise.

The angle estimation unit 322 illustrated in FIG. 4B generates, for each pixel, an actual pixel information list in which an angle θ of an estimated EPI straight line and an evaluation value IT (iteration number) of the straight line calculated in process of estimating the EPI straight line are associated with each other and registered, and stores the generated actual pixel information list in an actual pixel information storage unit 331.

An actual pixel information list to be stored in the actual pixel information storage unit 331 will be described with reference to FIG. 8.

The actual pixel information list is stored in such a way that an angle θ of an estimated EPI straight line is associated with an evaluation value IT (iteration number at which an angle θ is registered) of the angle θ for each pixel in an actual pixel array.

An actual pixel ID is an identifier that uniquely indicates pixels registered in the row.

An actual pixel array ID indicates which actual pixel array a pixel registered in the row is included in. The pixel number indicates pixel number of a pixel registered in the row.

For example, an actual pixel array ID and pixel number of a row are #01 and 1 respectively, which indicates that the row registers an angle θ and evaluation value IT of the first pixel of an pixel array $R_1$, Pxl ($R_1$, 1).

θ is an angle θ between an EPI straight line estimated for an actual pixel in the row and X-axis.

A case where θ is zero means that an object to be photographed corresponding to the pixel is estimated to be far from a lens (as far as it can be interpreted as infinity).

Meanwhile, a case where θ is large means that an object to be photographed corresponding to the pixel is close to a lens. θ may be any value between 0 and a maximum value $θ_{max}$ that is decided depending on a camera characteristic. A value of $θ_{max}$ is stored in the imaging setting storage unit 410.

An evaluation value IT is a numerical value indicating the number of times that iteration is performed until an angle θ is registered for the pixel. The smaller the numerical value is, the higher reliability of an angle θ registered for the pixel is.

Returning to FIG. 4B, description will be continued.

When the interpolation image setting unit 323 receives an EPI from the EPI generation unit 321, the interpolation image setting unit 323 defines a pixel array of an interpolation image on the EPI on the basis of interpolation setting information stored in the interpolation setting storage unit 332.

A pixel array of an interpolation image defined on an EPI will be described with reference to FIG. 9.

In an EPI transmitted from the EPI generation unit 321, pixel arrays of a photographed image are arranged at intervals corresponding to disparities. FIG. 9 illustrates, according to the above example, an example where actual pixel arrays 1 to 4 (the first, fourth, seventh and $10^{th}$ rows of the EPI) are arranged at intervals corresponding to disparity d.

The interpolation image setting unit 323 places a predetermined number of interpolation pixel arrays between actual pixel arrays on the basis of interpolation setting information. Here, interpolation setting information defines equally inserting two interpolation pixel arrays between actual pixel arrays. In this case, pixel arrays of the interpolation image (interpolation pixel arrays 1 to 6, $V_1$ to $V_6$) (the second, third, fifth, sixth, eighth and ninth rows in the EPI) are inserted on the EPI according to interpolation setting information.

The interpolation image setting unit 323 inserts interpolation pixel arrays between actual pixel arrays. At this time, a pixel value of each pixel (interpolation pixel) of the inserted interpolation pixel arrays is zero.

This processing is equal to that a virtual lens (interpolation lens) is placed between the sub-lenses $SL_1$ to $SL_4$ (actual lenses) and a model of pixel arrays of an image estimated to be obtained from the interpolation lens is placed on the EPI.

Figure 9:
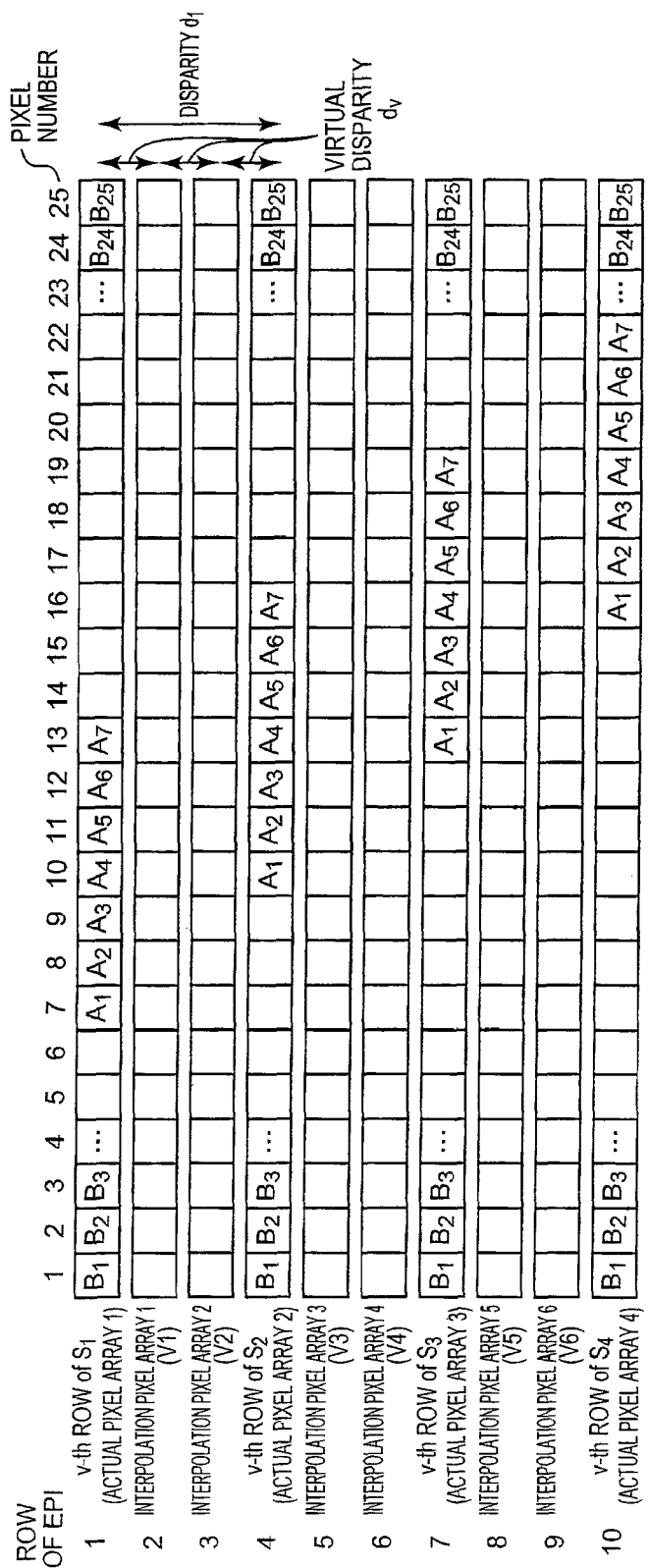
FIG. 9 is a schematic diagram illustrating an interpolation pixel insertion processing according to the first embodiment.

For example, an interpolation pixel array 1 in FIG. 9 is a pixel array in the v-th row of a virtual sub-image (interpolation image) $S_{V1}$ that is estimated to be obtained from an interpolation lens $SL_{V1}$ between a sub-lens $SL_1$ corresponding to an actual image $S_1$ and a sub-lens $SL_2$ corresponding to an actual image $S_2$. The interpolation lens $SL_{V1}$ exists at a position that is on a straight line formed by the sub-lenses $SL_1$ to $SL_4$ and apart from the sub-lens $SL_1$ by a virtual disparity $d_v (=d_1/3)$.

A position on an EPI to which an interpolation pixel array is inserted and the number of interpolation pixel arrays to be inserted can be properly decided by interpolation setting. For example, an interpolation pixel array 1 and interpolation pixel array 2 of an interpolation image that are apart from an actual pixel array 1 by a virtual disparity $dv_1=d_1/5$ and a virtual disparity $dv_2=d_1/2$ respectively may be inserted into between the actual pixel array 1 of an actual image $S_1$ and the actual pixel array 2 of an actual image $S_2$. It may be set so that three interpolation pixel arrays are inserted into between the actual pixel array 1 and the actual pixel array 2 and no interpolation pixel array is inserted into between the actual pixel array 2 and an actual pixel array 3.

Returning to FIG. 4B, description will be continued.

The interpolation image setting unit 323 transmits an EPI to which interpolation pixel arrays were inserted to the correspondence detection unit 324. The correspondence detection unit 324 extracts, for each actual pixel of the transmitted EPI, an interpolation pixel corresponding to the pixel.

The correspondence detection unit 324 detects, for each actual pixel on the EPI, the actual pixel and interpolation pixels on an estimated EPI straight line registered for the pixel, as a set of corresponding pixels. This processing is performed in descending order of an actual pixel having higher reliability (a registered evaluation value IT is smaller). For each set of corresponding pixels, an evaluation value IT of the actual pixel is set to be the reliability (evaluation value $IT_r$) of the correspondence relationship.

When the correspondence detection unit 324 extracts information indicating one actual pixel, a set of interpolation pixels corresponding to the actual pixel, and an corresponding evaluation value $IT_r$ of the correspondence (hereinafter referred to as correspondence information), the correspondence detection unit 324 transmits the correspondence information to the correspondence evaluation unit 325.

When the correspondence evaluation unit 325 receives correspondence information from the correspondence detection unit 324, the correspondence evaluation unit 325 evaluates the likelihood of the correspondence relationship. The evaluation is performed based on an evaluation value $IT_r$ of the correspondence and an interpolation pixel list, which will be described later, stored in the interpolation information storage unit 333. A specific evaluation method will be described later.

When the correspondence evaluation unit 325 has completed evaluation of the likelihood of correspondence for one correspondence information, the correspondence evaluation unit 325 transmits the correspondence information and evaluation result thereof to the pixel value addition unit 326.

The pixel value addition unit 326 adds a pixel value to an interpolation pixel of an EPI on the basis of the transmitted correspondence information and evaluation result and stores the added result in an interpolation pixel list stored in the interpolation information storage unit 333.

Hereinafter, the interpolation pixel list stored in the interpolation information storage unit 333 will be described with reference to FIG. 10.

The interpolation pixel list stores an interpolation pixel ID (an interpolation pixel array ID and pixel number) that uniquely indicates each interpolation pixel on an EPI, a pixel value of the interpolation pixel up to the present, the number of times when a pixel value of an actual pixel were added to the interpolation pixel (the number of times of addition), and an evaluation value $IT_r$ of the interpolation pixel so as to be associated with one another.

If a pixel value has been never added, both of a pixel value and an evaluation value $IT_r$ are NULL.

Here, an evaluation value $IT_r$ of an interpolation pixel is an evaluation value of an actual pixel having the smallest evaluation value IT (the highest reliability) of actual pixels corresponding to the pixel (actual pixels whose pixel value was added to the interpolation pixel up to the present).

Hereinafter, interpolation pixel value addition processing performed by the correspondence detection unit 324, correspondence evaluation unit 325 and pixel value addition unit 326 will be briefly described with reference to FIGS. 11A to 11C.

Figure 11A:
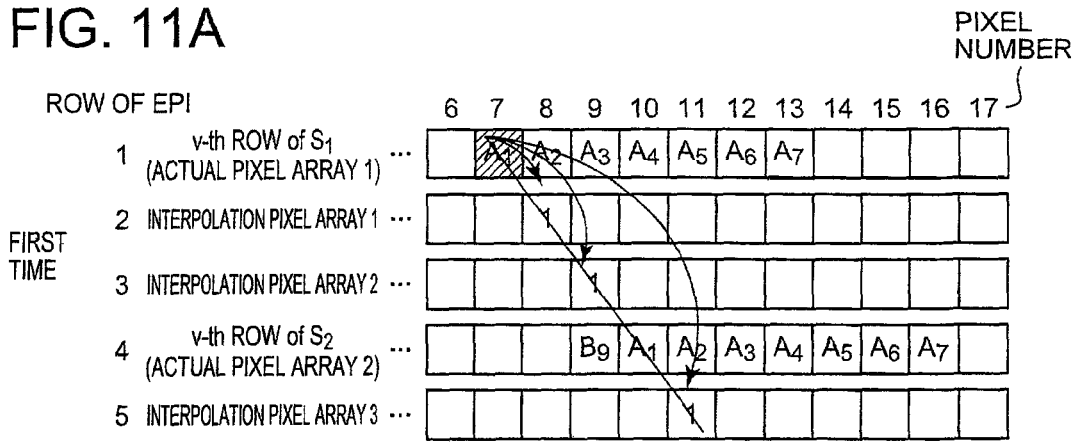
FIGS. 11A to 11C are schematic diagrams illustrating a pixel value addition processing according to the first embodiment.
Figure 11B:
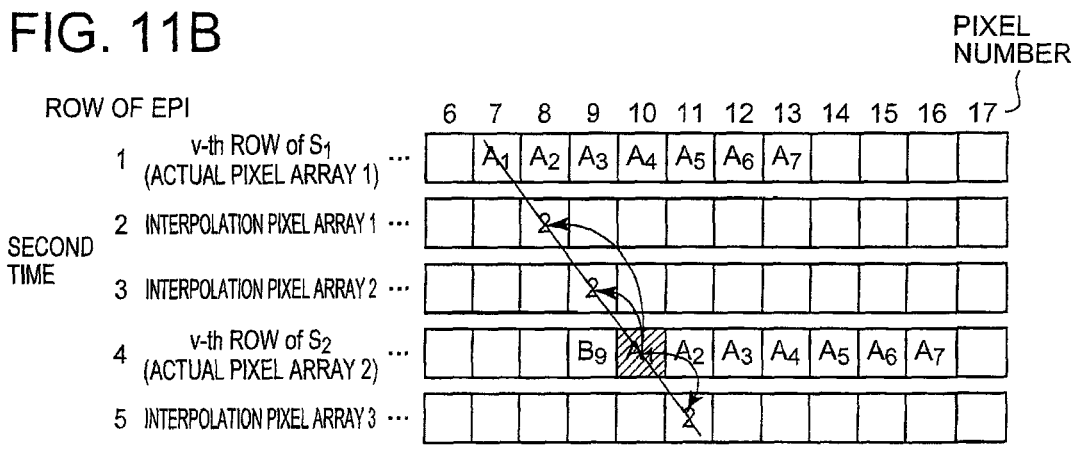
Figure 11C:
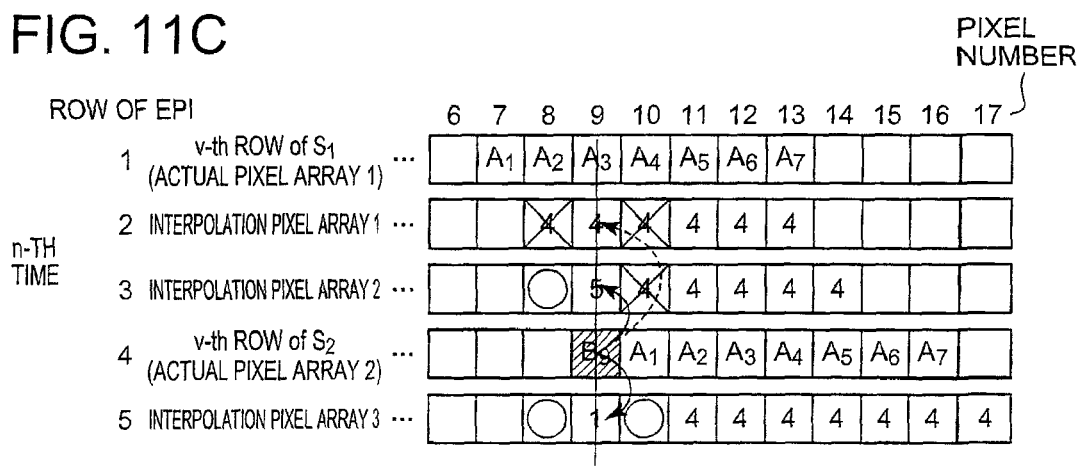

In FIGS. 11A to 11C, the number of times when a pixel value was added to an interpolation pixel is indicated by a numerical value within the interpolation pixel in an interpolation pixel array. If the number of times of addition is zero, then numerical value 0 is omitted.

First, the correspondence detection unit 324 sets an actual pixel Pxl ($R_1$, 7) indicated by diagonal lines in FIG. 11A to be an actual pixel of interest, reads a registered angle θ from an actual pixel information list stored in the actual pixel information storage unit 331, and detects Pxl ($V_1$, 8), Pxl ($V_2$, 9), Pxl ($V_3$, 11), . . . as corresponding interpolation pixels (interpolation pixels on an estimated EPI straight line) on the basis of the angle θ.

Next, the correspondence evaluation unit 325 evaluates the likelihood of correspondence between Pxl ($R_1$, 7) and Pxl ($V_1$, 8).

That is, it is determined, referring to an interpolation pixel list, whether a pixel value has been added to pixels at both sides adjacent to Pxl ($V_1$, 8) from an actual pixel whose evaluation value IT is less than (reliability is higher than) that of Pxl ($R_1$, 7). If a pixel value has not been added to the pixels at the both sides from an actual pixel having a lower evaluation value IT, it is estimated that correspondence is likely.

In FIG. 11A, since a pixel value has not been added to (Pxl ($V_1$, 7) and Pxl ($V_1$, 9)) at both sides adjacent to Pxl ($V_1$, 8), the correspondence evaluation unit 325 determines that correspondence between Pxl ($R_1$, 7) and Pxl ($V_1$, 8) is likely.

Then, the pixel value addition unit 326 adds a pixel value of Pxl ($R_1$, 7) to Pxl ($V_1$, 8). Specifically, the number of times of addition of a row of Pxl ($V_1$, 8) in the interpolation pixel list is incremented and a pixel value is added. Further, if an evaluation value of the row is NULL, an evaluation value IT of an actual pixel Pxl ($R_1$, 7) is registered as an evaluation value $IT_r$.

If a pixel value has been added one or more times, a numerical value calculated using the following Expression (2) is registered as a numerical value after the addition.

$$V' = \frac{(V \cdot t) + Val}{t + 1} \quad (2)$$

Where V' is an updated pixel value, V is a pre-updated pixel value, Val is a pixel value of an actual pixel of interest, and t is the number of times of addition before incrementation.

Hereinafter, the determination processing and addition processing are similarly performed on other interpolation pixels (Pxl ($V_2$, 9), Pxl ($V_3$, 11), . . . ) extracted for an actual pixel of interest Pxl ($R_1$, 7).

When processing is completed for an actual pixel of interest Pxl ($R_1$, 7), a subsequent actual pixel of interest is selected and a pixel value is similarly added to a corresponding interpolation pixel thereof. FIG. 11B illustrates a processing result where the subsequent actual pixel of interest is Pxl ($R_2$, 10).

FIG. 11C illustrates processing where processing further continues, and a pixel Pxl ($R_2$, 9) corresponding to a portion $B_9$ of the background B is selected as an actual pixel of interest at the-n-th step.

θ value registered for Pxl ($R_2$, 9) is zero, and Pxl ($V_1$, 9), Pxl ($V_2$, 9), Pxl ($V_3$, 9) . . . are extracted as corresponding interpolation pixels candidates thereof. In FIG. 11B, a pixel value of Pxl ($R_2$, 10) is added to Pxl ($V_1$, 8), Pxl ($V_2$, 9) and Pxl ($V_3$, 11).

The correspondence evaluation unit 325 evaluates the likelihood of correspondence between this Pxl ($R_2$, 9) and each of the interpolation pixels Pxl ($V_1$, 9), Pxl ($V_2$, 9) and Pxl ($V_3$, 9).

That is, it is determined whether an interpolation pixel adjacent to each of extracted corresponding pixel candidates is an interpolation pixel to which a pixel value of an actual pixel having a smaller evaluation value IT has been added (an interpolation pixel having a smaller $IT_r$ than an actual pixel of interest) (a pixel indicated by x in FIG. 11C).

An interpolation pixel whose adjacent pixels at both sides have a smaller $IT_r$ than an actual pixel of interest (for example, Pxl ($V_1$, 9)) is estimated to be a pixel corresponding to an object to be shielded by occlusion (an occlusion pixel). Therefore, the interpolation pixel is determined not to correspond to an actual pixel of interest Pxl ($R_2$, 9), and a pixel value is not added.

Meanwhile, under the estimation if $IT_r$ of at least one of the interpolation pixels adjacent to an interpolation pixel is more than or equal to IT of an actual pixel of interest (Pxl ($V_2$, 9) and Pxl ($V_3$, 9)), the interpolation pixel is not an occlusion pixel and therefore a pixel value of an actual pixel of interest Pxl ($R_2$, 9) is added.

At this time, also if a pixel value of an actual pixel having a smaller evaluation value IT has been added to only one of the interpolation pixels adjacent to an interpolation pixel, a pixel value of an actual pixel Pxl ($R_2$, 9) is added. Such an interpolation pixel is considered to correspond to an edge portion of an object to be photographed hided by occlusion. By adding a pixel value of a pixel corresponding to an object to be photographed that is far from the edge portion, an edge can be "rounded".

Whether an interpolation pixel is an occlusion pixel or not can be simply determined on the basis of whether a pixel value of an actual pixel having a smaller evaluation value IT (a higher reliability) is registered for an adjacent interpolation pixel thereof, thereby generating an interpolation image maintaining information on the depth of a light field image.

Here, only if a pixel value of an actual pixel having a smaller evaluation value IT is added to both of adjacent interpolation pixels, the interpolation pixels are determined to be occlusion pixels. However, a standard for determining whether an interpolation pixel is an occlusion pixel or not is not limited to this. For example, if a pixel value of an actual pixel having a smaller evaluation value is added to at least one of the interpolation pixels adjacent to an interpolation pixel, the interpolation pixel may be determined to be an occlusion pixel.

By such a determination method, correspondence between an actual pixel and an interpolation pixel can be more strictly determined.

If a pixel value of an actual pixel having a smaller evaluation value IT has been added to an interpolation pixel itself, not to an adjacent pixel, the pixel may be determined to be an occlusion pixel.

When pixel value addition processing is completed and an interpolation pixel list registered in the interpolation information storage unit 333 is updated, the pixel value addition unit 326 transmits to the correspondence detection unit 324 that processing for the current actual pixel of interest has been completed. Then, the correspondence detection unit 324 detects correspondence for a subsequent actual pixel and similarly performs processing for the subsequent actual pixel. When all actual pixels have been subjected to the above processing, generation of an interpolation image for the EPI is completed.

When interpolation images have been generated for all EPIs generated by the EPI generation unit 321, the output unit 350 outputs interpolated EPIs (interpolation images and actual images) to an external apparatus. Then, the interpolation image generation apparatus 30 terminates processing.

Next, processing in which the interpolation image generation apparatus 30 having the above configuration generates an interpolation image will be described with reference to FIGS. 12 to 19.

Figure 12:
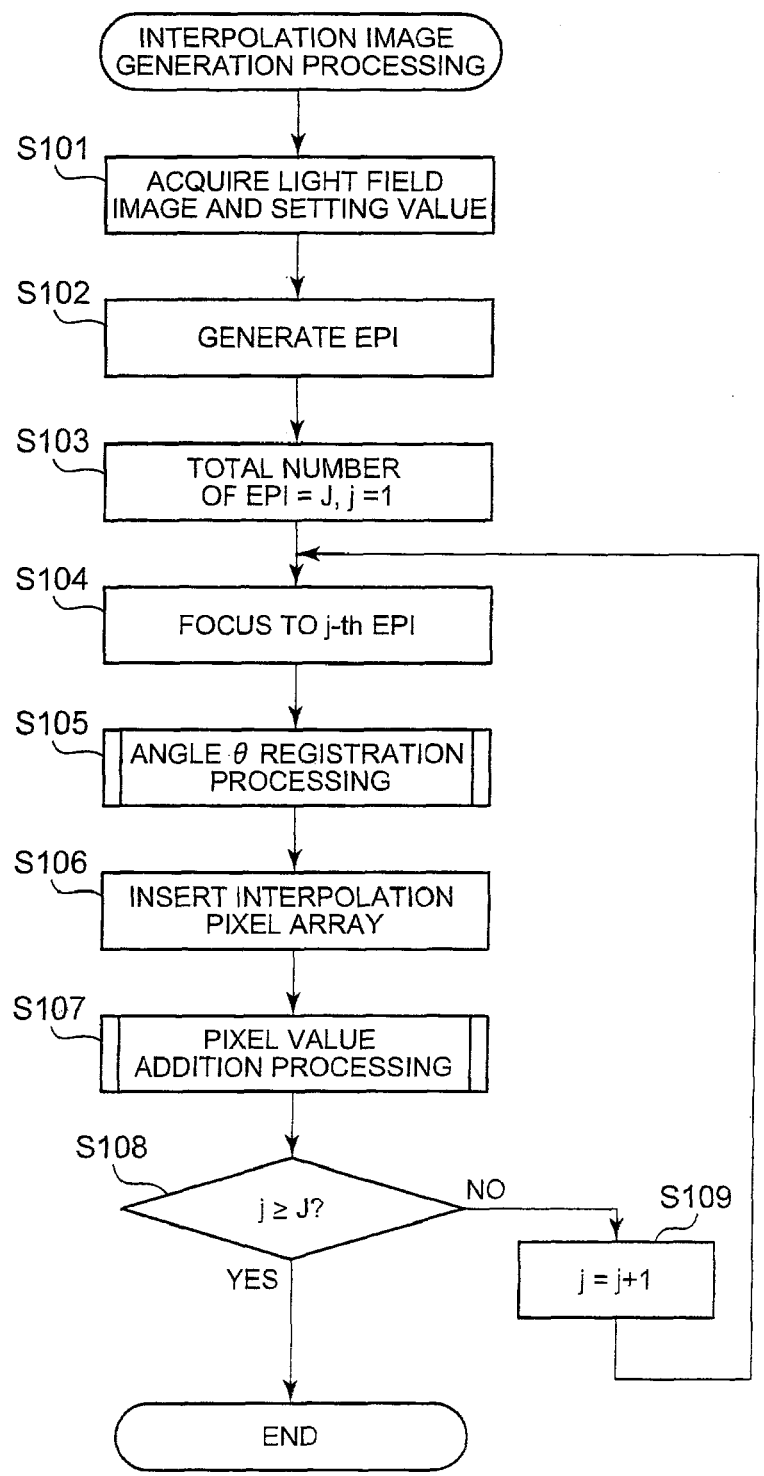
FIG. 12 is a flow chart illustrating an interpolation image generation processing according to the first embodiment.

In the interpolation image generation apparatus 30, when the input unit 310 acquires an light field image LF and imaging setting information, the information processing unit 320 starts interpolation image generation processing illustrated in FIG. 12.

When interpolation image generation processing is started, the input unit 310 transmits the light field image LF and the imaging setting information to the EPI generation unit 321 (Step S101).

The EPI generation unit 321 generates an EPI illustrated in FIG. 5C from the acquired light field image LF and imaging setting information (Step S102).

The EPI generation unit 321 calculates the number of generated EPIs J, numbers the EPIs with I to J, and assigns 1 to a counter j (Step S103).

Next, the EPI generation unit 321 focuses the j-th EPI. Steps S105 to S108 are performed for the focused EPI (Step S104).

For the j-th EPI, the angle estimation unit 322 performs angle θ registration processing (Step S105). Angle θ registration processing will be described later.

When angle θ registration processing is completed, an angle θ is registered for each actual pixel of the j-th EPI and an actual pixel information list is stored in the actual pixel information storage unit 331, the interpolation image setting unit 323 inserts interpolation pixel arrays into the j-th EPI as illustrated in FIG. 9 (Step S106).

When interpolation pixel arrays have been inserted, the correspondence detection unit 324, correspondence evaluation unit 325 and pixel value addition unit 326 perform pixel value addition processing illustrated in FIGS. 11A to 11C (Step S107). Pixel value addition processing (pixel value addition processing 1) will be described later.

When pixel value addition processing is completed, processing for the EPI is terminated. Then, whether there is an unprocessed EPI is determined by comparing j and J (Step S108). If j is less than J and there is an unprocessed EPI (Step S108; NO), j is incremented (Step S109) and processing of Steps S104 to S108 are repeated.

Meanwhile, if j is more than or equal to J and there is no unprocessed EPI (Step S108; YES), the information processing unit 320 terminates the interpolation image generation processing.

When the interpolation image generation processing is terminated, the output unit 350 transmits an interpolation image and actual image stored in the interpolation information storage unit 333 to the image reconstruction unit 220. Subsequent processing will be described later.

Figure 13:
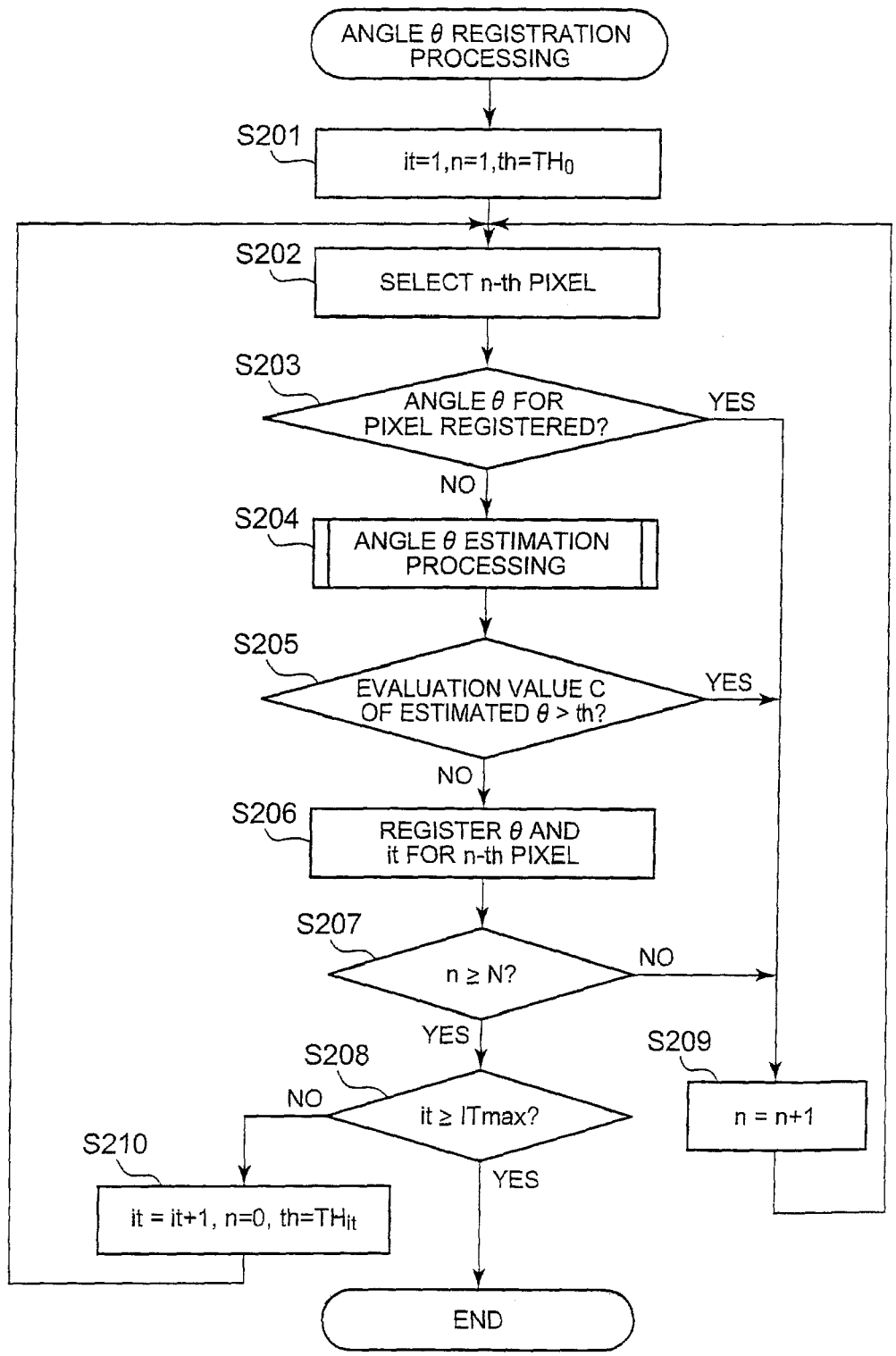
FIG. 13 is a flow chat illustrating an angle θ registration processing according to the first embodiment.

Next, angle θ registration processing (Step S105) will be described in detail with reference to FIG. 13.

In angle θ registration processing, first, the angle estimation unit 322 initializes a variable (Step S201).

Specifically, one is assigned to it, one is assigned to counter n, and the first threshold value $TH_0$ is assigned to th; and the number N of actual pixels on the EPI and the total number of times of iteration $IT_{max}$ are obtained. Here, $IT_{max}$ and $TH_0$ are numeral values stored in the interpolation setting storage unit 332. $IT_{max}$ and $TH_0$ may be numeral values previously decided by experiment or the like, or any numerical values inputted by a user. The angle estimation unit 322 numbers actual pixels on the EPI with numbers 1 to N at Step S201.

When Step S201 is completed, the angle estimation unit 322, next, selects the n-th pixel as an actual pixel of interest (Step S202).

The angle estimation unit 322 refers to an actual pixel information list stored in the actual pixel information storage unit 331, and determines whether an angle θ is registered for the actual pixel of interest (Step S203).

If an angle θ has been already registered (Step S203; YES), the angle estimation unit 322 terminates processing for the actual pixel, that is, n is incremented (Step S209) and returns to Step S202.

If an angle θ is not registered for the actual pixel of interest (Step S203; NO), the angle estimation unit 322 performs angle θ estimation processing for the actual pixel of interest (Step S204). Angle θ estimation processing will be described later.

When angle θ estimation processing is terminated and an angle θ estimated for the actual pixel of interest and an evaluation value C of the angle θ are calculated, the angle estimation unit 322, next, determines whether the evaluation value C of the angle θ is more than a threshold value th (Step S205). If the evaluation value C of the angle θ is more than a threshold value th (Step S205; YES), the angle θ does not have a sufficient reliability in this iteration and therefore is not registered for the pixel in this iteration, that is, n is incremented (Step S209) and returns to Step S202.

Meanwhile, if the evaluation value C of the angle θ is less than or equal to a threshold value th (Step S205; NO), the angle estimation unit 322 registers the angle θ and evaluation value IT (=the current number of times of iteration it) for the actual pixel of interest in an actual pixel information list in the actual pixel information storage unit 331 (Step S206).

Next, the angle estimation unit 322 determines whether n is more than or equal to N (Step S207). If n is less than N (Step S207; NO), there is an unprocessed actual pixel at the current iteration and therefore the angle estimation unit 322 increments n (Step S209) and returns to Step S202.

Meanwhile, if n is more than or equal to N (Step S207; YES), processing for all actual pixels has been completed in this iteration. Thus, the angle estimation unit 322, next, determines whether the number of times of iteration has been completed (Step S208). That is, if it is less than $IT_{max}$ (Step S208; NO), the predetermined number of times of iteration has not been completed and therefore it is incremented, n is initialized and th is updated to a new threshold value $TH_{it}$ (Step S210). Then, processing from Step S202 is repeated.

At this time, an update rule for a threshold value th is decided according to interpolation setting stored in the interpolation setting storage unit 332. The threshold value th becomes larger as iteration is repeated (a standard for determining a straight line becomes less strict).

Here, $TH_{it}$ is a numerical value obtained by adding a predetermined difference Δth to the current th.

Here, a threshold value th is always updated in new iteration, but a method to update a threshold value in repeating iteration is not limited to this. If an angle θ is registered for a new actual pixel at the current iteration, since the pixel for which the angle θ has been registered is excluded in subsequent θ estimation processing, an angle θ can be registered for a new actual pixel even if the same threshold value th is used in the subsequent iteration. Therefore, if an angle θ is registered for a new actual pixel in the current iteration, $TH_{it}$ may be the same as the current th.

Meanwhile if it is more than or equal to $IT_{max}$ (Step S208; YES), a predetermined number of times of iteration have been completed, the angle estimation unit 322 terminates angle θ registration processing.

Figure 14:
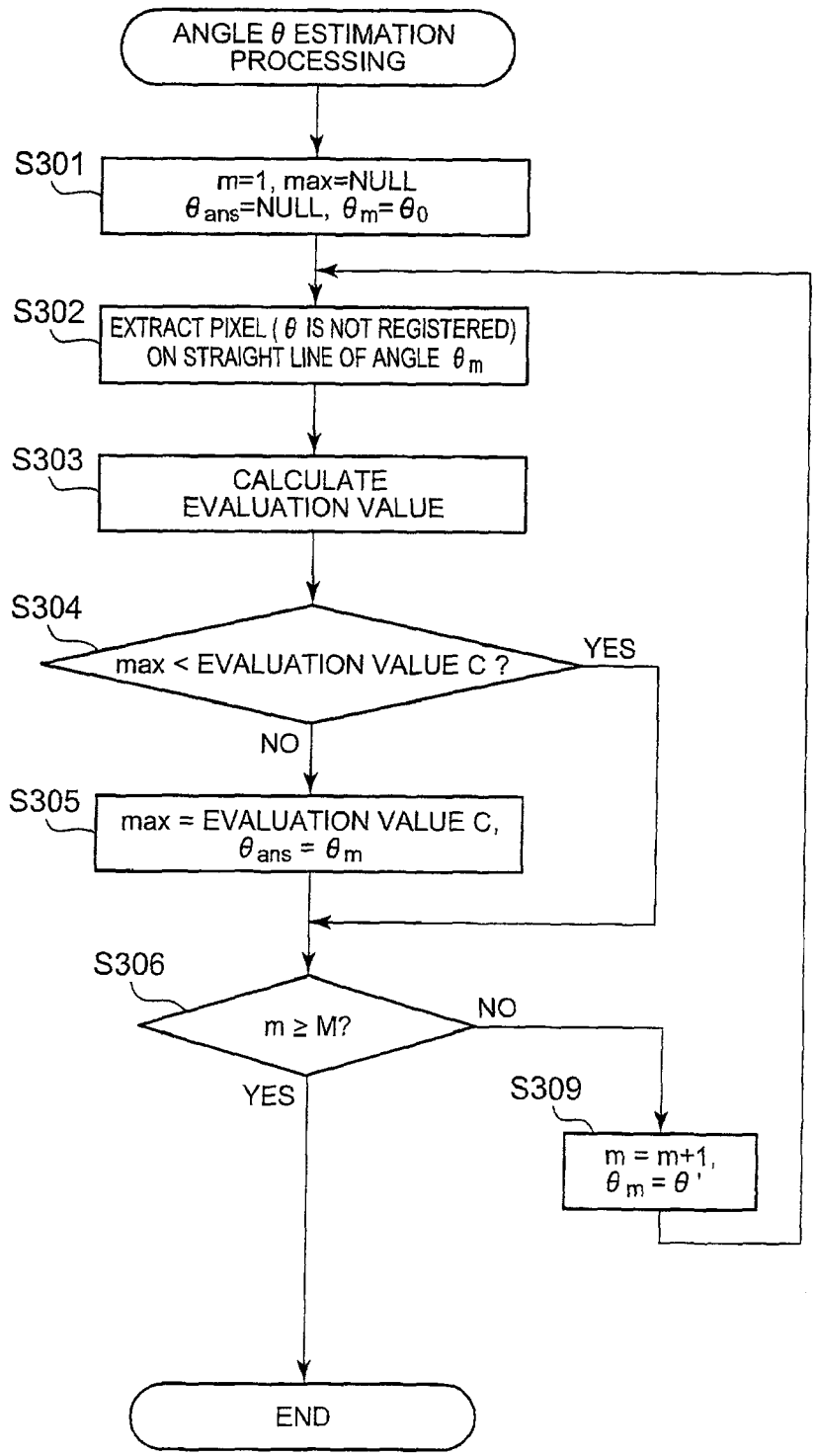
FIG. 14 is a flow chart illustrating an angle θ estimation processing according to the first embodiment.

Next, angle θ estimation processing performed at Step S204 of angle θ registration processing will be described with reference to FIG. 14.

When the angle estimation unit 322 starts angle θ estimation processing, the angle estimation unit 322 performs initialization of a variable (Step S301). That is, 1 is assigned to counter m; a null value NULL is assigned to an angle variable $θ_{ans}$ that is an angle estimated for an actual pixel of interest (an angle θ that is a solution of angle θ estimation processing) and a variable max indicating an evaluation value of the angle variable $θ_{ans}$ up to the present; and a default value $θ_0$ is assigned to a variable $θ_m$ indicating an angle to be subjected to current processing. A repeat count of angle θ estimation processing M is extracted.

M and $θ_0$ are numerical values stored in the interpolation setting storage unit 332. M and $θ_0$ may be numerical values obtained by experiment and/or the like and previously set by initial setting or any numerical values inputted by a user. Here, $θ_0$ is $θ_{max}$ that is a maximum angle in design.

When Step S301 is completed, the angle estimation unit 322, next, extracts an actual pixel on an EPI that exists on a straight line of an angle $θ_m$ passing through an actual pixel of interest and for which an angle θ has not been registered (Step S302).

Then, the angle estimation unit 322 uses a pixel value of the pixel extracted at Step S302 in Expression (1) to find an evaluation value C of a straight line Line ($θ_m$) that passing through an actual pixel of interest.

The angle estimation unit 322, next, compares a variable max and the evaluation value C to determine whether the evaluation value C calculated at Step S303 is the smallest value of evaluation values C calculated for the actual pixel of interest in previous loops, that is, whether the straight line Line ($θ_m$) is the most likely straight line for the actual pixel of interest (Step S304). If a value of max is NULL, NULL is calculated as infinity.

If max≥evaluation value C (Step S304; NO), since $θ_m$ is an angle of the most likely straight line of the actual pixel of interest at the present moment, the evaluation value C calculated at Step S303 is assigned to a variable max and $θ_m$ is assigned to a variable $θ_{ans}$ (Step S305).

Meanwhile, if max<evaluation value C (Step S304; YES), since a more likely angle θ has been registered for the actual pixel of interest, an angle $θ_m$ is not registered and Step S305 is skipped.

The angle estimation unit 322, next, determines whether a predetermined repeat count has been completed, by comparing m and M (Step S306).

If m≥M (Step S306; YES), since processing of the predetermined repeat count, that is, M times has been completed, the angle estimation unit 322 terminates angle θ estimation processing and starts angle θ registration processing at Step S205 with $θ_{ans}$ being an estimated angle of the actual pixel of interest and with a value of max being an evaluation value C.

Meanwhile, if m<M (Step S306; NO), since processing of the predetermined repeat count has not been completed, the angle estimation unit 322 increments a counter m and updates $θ_m$ to θ' and repeats processing from Step S302.

An update rule of $θ_m$ is in accordance with setting stored in the interpolation setting storage unit 332. Here, θ' is a value obtained by subtracting a predetermined numerical value A0 from a pre-updated $θ_m$.

Figure 15:
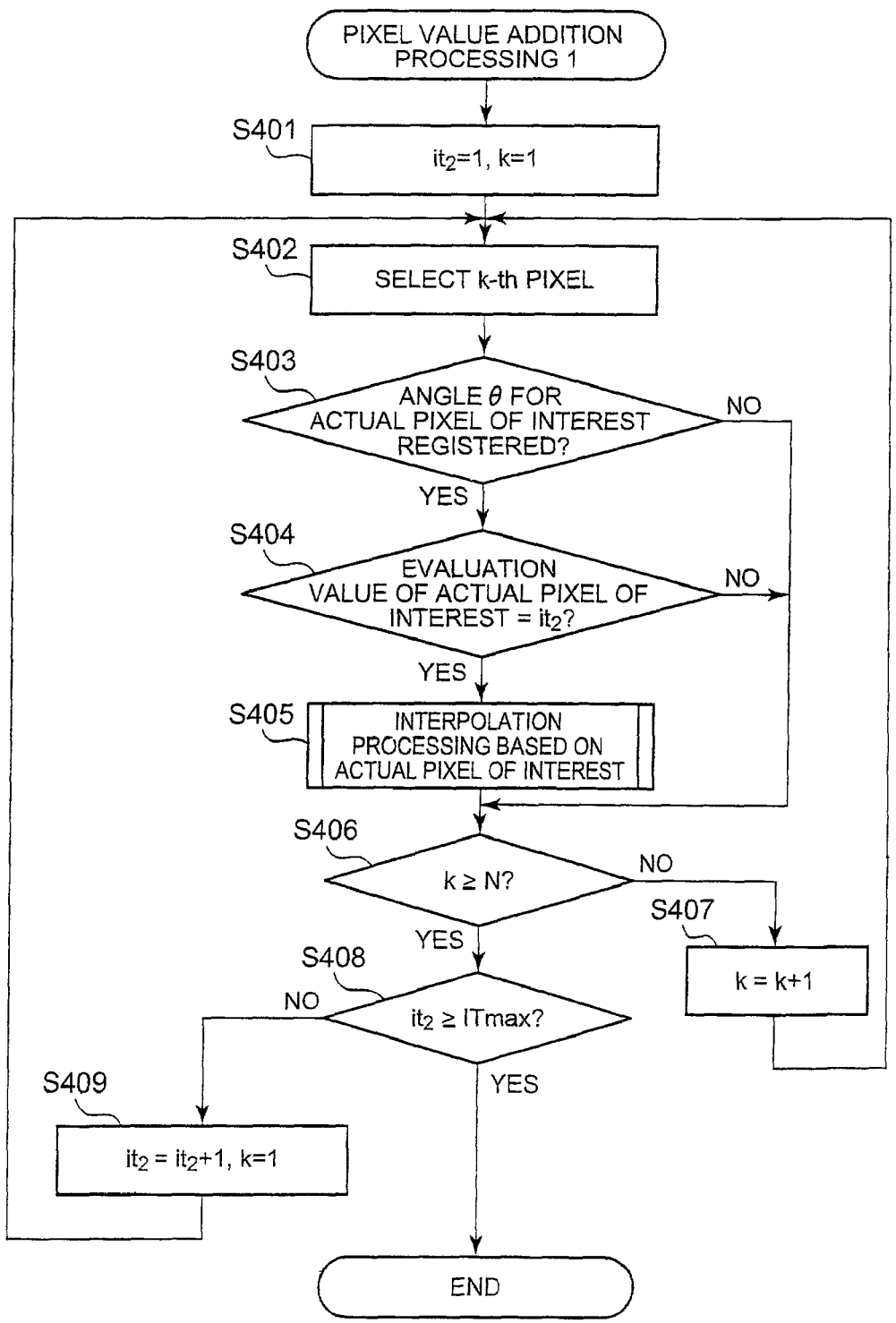
FIG. 15 is a flow chart illustrating a pixel value addition processing according to the first embodiment.

Next, a first example (pixel value addition processing 1) of pixel value addition processing (Step S107) of the interpolation image generation processing illustrated in FIG. 12 will be described with reference to FIG. 15.

In pixel value addition processing 1, first, the correspondence detection unit 324 initializes a variable (Step S401).

At Step S401, the correspondence detection unit 324 assigns 1 to a variable $it_2$ indicating the current number of times of iteration, and a counter variable k. The correspondence detection unit 324 also obtains the number N of actual pixels on an EPI and the total number of iteration $IT_{max}$ of pixel value addition processing 1, as well as numbering information on actual pixels registered in angle θ registration processing. Here, number of each actual pixel is decided according to in what number of row the actual pixel is registered in an actual pixel information list stored in the actual pixel information storage unit 331.

Here, the number N of actual pixels is the number N of actual pixels extracted by angle θ registration processing; and the total number of times of iteration, $IT_{max}$, is the same as $IT_{max}$ extracted by angle θ registration processing.

When initialization is completed, the correspondence detection unit 324 selects the k-th actual pixel as an actual pixel of interest (Step S402). Specifically, actual pixel information registered in the k-th row in an actual pixel information list is extracted, and an actual pixel thereof is set to be an actual pixel of interest.

Next, the correspondence detection unit 324 determines whether an angle θ is registered for the actual pixel of interest (Step S403). That is, it is determined whether a value of an angle θ in the k-th row in the actual pixel information list is NULL; and if it is NULL, it is determined that an angle θ is not registered for the actual pixel of interest (Step S403; NO). Then, processing is terminated for the pixel, and jumps to Step S406.

Meanwhile, if an angle θ in the k-th row in the actual pixel information list is not NULL and an angle θ is registered for the actual pixel of interest (Step S403; YES), the correspondence detection unit 324, next, compares an evaluation value IT of the actual pixel of interest with the current number of times of iteration $it_2$ (Step S404).

If the evaluation value IT of the actual pixel of interest is different from the current number of times of iteration $it_2$ (Step S404; NO), the actual pixel is not processed in the current iteration and therefore the correspondence detection unit 324 terminates processing for the pixel.

That is, processing by the correspondence detection unit 324 jumps to Step S406.

Meanwhile, if the evaluation value IT of the actual pixel of interest is equal to the current number of times of iteration $it_2$ (Step S404; YES), the correspondence detection unit 324 performs interpolation processing based on the actual pixel of interest (Step S405). Processing performed at Step S405 will be described later.

Here, an evaluation value IT of an actual pixel of interest indicates at what number of iteration of angle θ registration processing (FIG. 14) an angle θ for the actual pixel of interest is registered. Performing interpolation processing on the basis of an actual pixel whose evaluation value IT is equal to the number of times of iteration, $it_2$, and repeating iteration mean that interpolation processing is performed in ascending order of an actual pixel whose evaluation value is smaller and in which variance of correspondence relationship due to occlusion is less possible.

When interpolation processing (Step S405) on the basis of an actual pixel of interest is completed, the correspondence detection unit 324 determines whether there is an unprocessed actual pixel (Step S406). Specifically, whether k is more than or equal to N is determined; and if k is less than N (Step S406; NO), the correspondence detection unit 324 determines that there is an unprocessed actual pixel in the iteration. Then, k is incremented (Step S407) and a subsequent actual pixel, as an actual pixel of interest, is subjected to repeat processing from Step S402.

Meanwhile, if k is more than or equal to N and it is determined that all actual pixels have been processed in the iteration (Step S406; YES), the correspondence detection unit 324 terminates the iteration. Then, by comparing $it_2$ with $IT_{max}$, it is determined whether a predetermined number of times of iteration $IT_{max}$ have been repeated (Step S408).

If $it_2$ is less than $IT_{max}$ (Step S408; NO), it is determined that processing has not been repeated the predetermined number of times of iteration, the correspondence detection unit 324 proceeds to a subsequent iteration.

Specifically, the correspondence detection unit 324 increments $it_2$ and assigns 1 to k (Step S409), and processing is repeated from Step S402.

Meanwhile, if $it_2$ is more than or equal to $IT_{max}$ (Step S408; YES), the correspondence detection unit 324 terminates pixel value addition processing 1.

Next, the interpolation processing based on an actual pixel of interest performed at Step S405 of pixel value addition processing 1 will be described with reference to FIG. 16.

In the interpolation processing based on an actual pixel of interest, first, the correspondence detection unit 324 extracts an angle θ of the actual pixel of interest from an actual pixel information list in the actual pixel information storage unit 331.

Then, an estimated EPI straight line Line (θ) of the actual pixel of interest is defined on the basis of the extracted angle θ, and interpolation pixels on the EPI straight line are extracted (Step S501).

Next, the correspondence detection unit 324 obtains the number I of extracted interpolation pixels, and assigns 1 to a counter variable i (Step S502). The correspondence detection unit 324 numbers the respective interpolation pixels extracted at Step S502 with 1 to I.

When the correspondence detection unit 324 completes Step S502, the correspondence evaluation unit 325, next, refers to an interpolation pixel list stored in the interpolation information storage unit 333 and extracts interpolation pixels adjacent to the i-th interpolation pixel (Step S503). That is, the correspondence evaluation unit 325 extracts an interpolation pixel array ID ($ID_i$) and pixel number ($N_i$) of the i-th interpolation pixel from the interpolation pixel list, and extracts interpolation pixels whose interpolation pixel array ID is ID, and whose pixel numbers is $N_i+1$ and $N_i-1$, respectively.

Then, the correspondence evaluation unit 325 determines whether the i-th interpolation pixel is an occlusion pixel (Step S504).

Whether the i-th interpolation pixel is an occlusion pixel or not is determined based on whether a pixel value has been added to both of the adjacent interpolation pixels extracted at Step S503 in any of previous iterations (an evaluation value $IT_r$ that is smaller than the current number of times of iteration $it_2$ has been registered for the adjacent interpolation pixels in the interpolation pixel list).

If an evaluation value $IT_r$ smaller than $it_2$ has been registered for both of the adjacent interpolation pixels, the i-th interpolation pixel is an occlusion pixel and is estimated not to correspond to the actual pixel of interest. That is, the i-th interpolation pixel is estimated to be a pixel that corresponds to an object that exists before an object to which the actual pixel of interest corresponds. Accordingly, the correspondence evaluation unit 325 determines that the i-th interpolation pixel is an occlusion pixel (Step S504; YES), and jumps to Step S506 without instructing the addition of a pixel value to the pixel value addition unit 326.

Meanwhile, if it is determined that the i-th interpolation pixel is not an occlusion pixel (Step S504; NO), the correspondence evaluation unit 325 transmits the addition of a value of the actual pixel of interest to the i-th interpolation pixel, to the pixel value addition unit 326, on the basis of the estimation that the i-th interpolation pixel corresponds to the actual pixel of interest. The pixel value addition unit 326 adds a pixel value of the i-th interpolation pixel according to Expression (2), and registers the added pixel value in a row corresponding to the i-th interpolation pixel in the interpolation pixel list (Step S505). At Step S505, if the current number of times of iteration it$_2$ is less than a registered evaluation value IT$_r$, the pixel value addition unit 326 registers it$_2$ as a new evaluation value IT$_r$ in the row.

When the pixel value addition unit 326 adds a pixel value of the actual pixel of interest to the interpolation pixel to update the interpolation pixel list, the correspondence detection unit 324 compares i and I to determine whether all of the interpolation pixels extracted at Step S501 have been processed (Step S506).

If i is more than or equal to I and all of the extracted interpolation pixels have been subjected to the completion of the above processing (Step S506; YES), the correspondence detection unit 324 terminates interpolation processing based on an actual pixel of interest.

Meanwhile, if i is less than I and therefore it is determined that there is an unprocessed interpolation pixel (Step S506; NO), the correspondence detection unit 324 increments i (Step S507), processing from Step S503 is repeated for a subsequent interpolation pixel. When all pixels have been subjected to addition processing of interpolation images, it is determined that generation of interpolation images for the EPI is completed and interpolation processing based on an actual pixel of interest is terminated.

The interpolation image generation apparatus 30 generates an interpolation image according to the above series of processing. The interpolation image generation apparatus 30 repeatedly performs the above processing to generate an interpolation image in a planar way relative to an actual pixel. This planar generation processing of an interpolation image will be described with reference to FIGS. 17A and 17B.

First, a first-stage set of EPIs (EPI (V1$_1$), EPI (V2$_1$) . . . , EPI (H1$_1$), EPI (H2$_1$) . . . ) is generated vertically and horizontally from actual images (actual$_{11}$ to actual$_{12}$ . . . ) indicated by circles in FIG. 17A. Each set of horizontal EPIs (EPI (H1$_1$), EPI (H2$_1$), . . . ) is composed of V pieces of EPIs and is defined by the number of sub-lenses in a vertical direction of a micro lens array LA (M pieces). That is, horizontal EPIs are defined by V·M pieces. Similarly, vertical EPIs are defined by N·U pieces. Therefore, the total number of EPIs are defined by V·M+N·U pieces.

The interpolation image generation apparatus 30, first, uses an actual image to generate a first-stage interpolation image indicated by V·M+N·U pieces of squares (FIG. 17A). Number 1 within squares mean that the squares are interpolation images of the first-stage.

Next, the first-stage interpolation image is used as a virtual actual image to generate a second-stage EPI group (EPI (V1$_2$), EPI (V2$_2$), EPI (V3$_2$) . . . ). Then, a second-stage interpolation image is generated (FIG. 17B). Number 2 within squares mean that the squares are interpolation images of the second-stage.

By generating interpolation images in two stages and in a planar way, the interpolation image generation apparatus 30 according to the present embodiment can virtually increase the number of planar samplings of an object to be photographed without increasing the number of lenses or the number of imaging elements.

Here, the second-stage interpolation image is generated using a set of vertical EPIs, but a method to generate second-stage EPIs is not limited to this. Second-stage EPIs may be generated using a set of horizontal EPIs. A second-stage interpolation image may be an interpolation image generated by averaging an intermediate-stage interpolation image generated vertically and an intermediate interpolation image generated horizontally.

When the above all interpolation images are generated, the interpolation image generation apparatus 30 outputs the generated images and position information of an actual lens and an interpolation lens to the image reconstruction unit 220 and terminates processing.

In the interpolation image generation apparatus 30 according to the first embodiment, since, by the above processing, a pixel value of an interpolation pixel where an occlusion is estimated to occur can be decided on the basis of only an actual pixel estimated to correspond to an object closer to a lens, an interpolation image that can address occlusion can be generated.

In the interpolation image generation apparatus 30 according to the first embodiment, a threshold value for registering an angle θ is changed for each iteration so that a standard for estimating an angle θ is initially strict and becomes less strict in later iteration. By this, an angle θ is registered for a pixel where occlusion does not occur and whose correspondence relationship is certain in early iteration; and correspondence relationship is defined even for a pixel whose correspondence relationship is not certain due to occlusion and noise in later iteration. Therefore, if a plurality of actual pixels are estimated to correspond to an interpolation pixel, an actual pixel whose correspondence relationship is more certain can be selected and a pixel value of an interpolation pixel can be decided based on a pixel value of the selected actual pixel.

Next, processing that the image reconstruction unit 220 reconstructs an image from a light field image LF generated by the interpolation image generation apparatus 30 (an interpolated EPI) will be described with reference to FIGS. 18 and 19. Here, an image obtained by refocusing a light field image LF to a position apart from a main lens ML by a distance a1 is reconstructed.

When the image reconstruction unit 220 receives an interpolated EPI and position information of an actual lens and an interpolation lens from the interpolation image generation apparatus 30, the image reconstruction unit 220 performs reconstructed image generation processing illustrated in FIG. 18.

When the image reconstruction unit 220 starts reconstructed image generation processing in FIG. 18, the image reconstruction unit 220, first, performs initialization processing (Step S601).

At Step S601, the image reconstruction unit 220 acquires setting of a reconstructed image from the reconstruction setting storage unit 420 in the storage unit 40. The setting of a reconstructed image includes information on a distance a1 of refocusing. The image reconstruction unit 220 also acquires imaging setting information from the imaging setting storage unit 410. The image reconstruction unit 220 assigns 1 to counter variables l and p, and further assigns 0 to a variable t$_p$ indicating the number of times when a pixel value is added to a pixel p (the p-th pixel).

Further, the total number L of actual lenses and interpolation lenses of an interpolation image, and the total number of pixels P of a reconstructed image are acquired.

The respective pixels of a reconstructed image are numbered with 1 to P. Actual lenses and interpolation lenses together are numbered with 1 to C.

When the above initialization processing (Step S601) is completed, the image reconstruction unit 220 selects a sub-image S corresponding to the first lens (lens 1) from acquired images (Step S602).

Next, where light is emitted from a position PS corresponding to a pixel of interest p on a reconstructed image, the image reconstruction unit 220 specifies a trajectory on which the light passes through a sub-lens 1 included in a micro lens array LA to reach an imaging surface IE with the use of position information of the lens 1 (the first corresponding sub-lens), and specifies a pixel on a sub-image existing at an end point PE where the light that follows the specified trajectory reaches a surface IE of an imaging element (Step S603).

Figure 19:
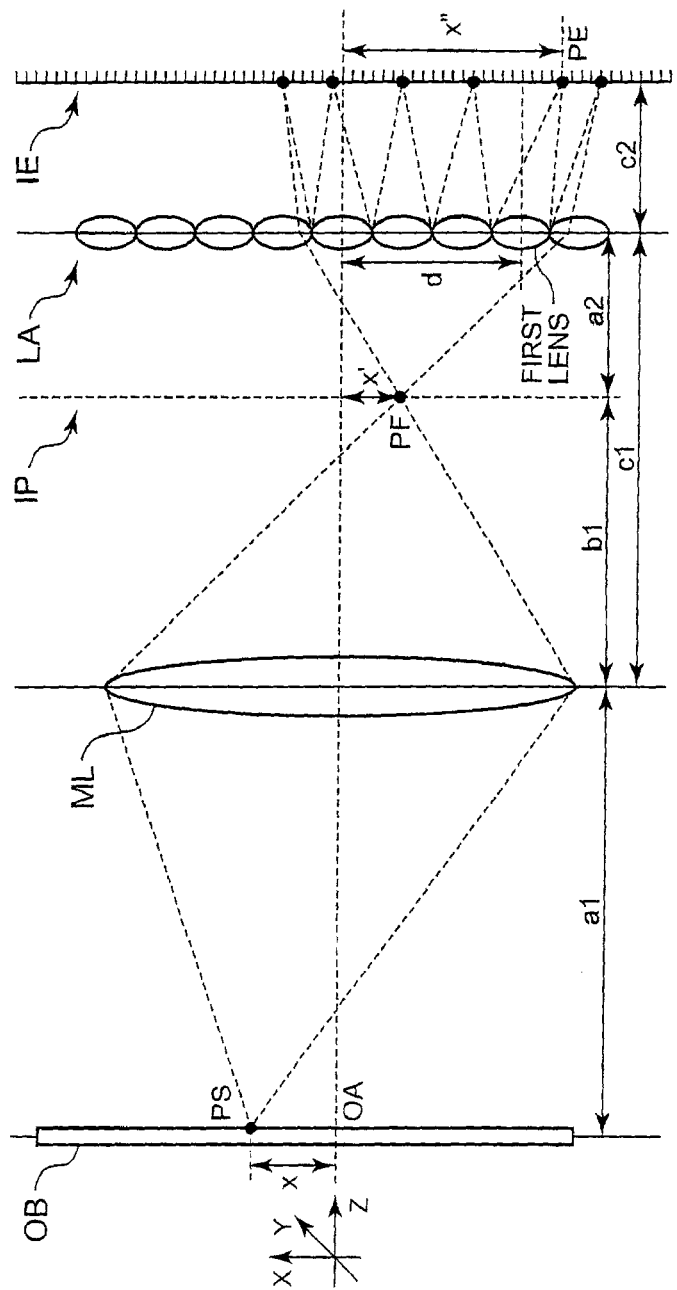
FIG. 19 is a diagram illustrating an optical device according to a second embodiment.

Specifically, a distance between a corresponding position PS on OB of a pixel of interest in X-axis direction and an optical axis OA is called x, and a distance between the end point PE and the optical axis OA is called x", as illustrated in FIG. 19.

Here, imaging setting acquired at Step S601 includes a focal length $f_{ML}$ of the main lens ML, a distance c1 between the main lens ML and the micro lens array LA, and a distance c2 between the micro lens array LA and the imaging surface IE. A distance d between the optical axis OA and an optical center of the lens 1 is calculated on the basis of lens position information. A distance indicated by distance information acquired at Step S601 is an object distance a1 between the main lens ML and the point of focus.

The image reconstruction unit 220 uses the focal length $f_{ML}$, and object distance a1 in the following Expression (3) to calculate a distance b1 between the main lens ML and the imaging surface IP of the main lens.

$$b1 = \frac{a1 \times f_{ML}}{a1 - f_{ML}} \quad (3)$$

Next, the image reconstruction unit 220 uses the object distance a1 and the distance b1 calculated using the above Expression (3) in the following Expression (4) to calculate a distance x' between the optical axis OA and an imaging point PF of the main lens ML.

$$x' = x \times \frac{b1}{a1} \quad (4)$$

After that, the image reconstruction unit 220 uses a distance c1 between the main lens ML and the micro lens array LA and the distance b1 calculated using the above Expression (3) in the following Expression (5) to calculate a distance a2 between the imaging surface of the main lens ML and the first lens.

$$a2 = c1 - b1 \quad (5)$$

Next, the image reconstruction unit 220 uses a distance d between the optical axis OA and a principal point of the first lens L, the distance x' calculated using the above Expression (4), a distance c2 between the micro lens array LA and an imaging element surface IE, and the distance a2 calculated using the above Expression (3) in the following Expression (6) to calculate a distance x" between the end point PE and the optical axis OA.

$$x'' = (d_l - x') \times \frac{c2}{a2} + d_l \quad (6)$$

Expressions (3) and (5) in Z-axis direction are derived from Gauss imaging formula. Expressions (4) and (6) in X-axis direction are derived from similarity of triangles. The above Expressions (4) and (6) use symbols x, x' and x" to calculate a distance in X-axis direction between a position PS of a pixel of interest and the optical axis OA, a distance between the optical axis OA and the imaging point PF of the main lens ML, and a distance between the end point PE and the optical axis OA. Similarly, by using symbols y, y' and y" in the above Expressions (5) and (7), a distance between a position PS of a pixel of interest and the optical axis OA, a distance between the optical axis OA and the imaging point PF of the main lens ML, and a distance between the end point PE and the optical axis OA can be calculated in Y-axis direction that is perpendicular to both of X-axis and Z-axis.

When the end point PE is decided, a pixel corresponding to PE is decided on a sub-image corresponding to the lens 1. Then, when the corresponding pixel is specified at Step S603 in FIG. 18, the image reconstruction unit 220 acquires a pixel value of the specified pixel.

Then, the image reconstruction unit 220 determines whether there is a pixel value corresponding to PE (a corresponding pixel exists on a sub-image and whose pixel value is not NULL) (Step S604).

If there is no pixel value (Step S604; NO), a pixel value is not added to a pixel p of a reconstructed image for the sub-image.

Since a pixel value is not added where a pixel value of an interpolation pixel is NULL, pixel value information of an interpolation pixel whose correspondence is not certain due to noise or occlusion can be excluded from a reconstructed image.

Meanwhile, if there is a corresponding pixel value (Step S604; YES), a pixel value of a corresponding pixel is added to a pixel p of a reconstructed image (Step S605).

At this time, the added pixel value Vp' is calculated using Expression (7).

$$V'_p = \frac{(V_p \cdot t_p) + V_{PE}}{t_p + 1} \quad (7)$$

Vp is a value of a pixel p before addition, $V_{PE}$ is a pixel value of a corresponding pixel; and $t_p$ is the number of times when a pixel value was added to a pixel p before.

At Step S605, $t_p$ is further incremented.

A pixel value of a pixel of interest p in a reconstructed image is initialized to a value "0" at the time of start of reconstructed image generation processing.

After that, the image reconstruction unit 220 compares 1 and L to determine whether addition processing has been completed for sub-images corresponding to all lenses (Step S606).

If 1 is less than L (Step S606; NO), it is determined that there is an unprocessed sub-image, and the image reconstruction unit 220 increments 1 (Step S607) and repeats processing from Step S602 for a subsequent lens.

Meanwhile, if 1 is more than or equal to L, it is determined that sub-images corresponding to all lenses have been processed (Step S606; YES). Then, the image reconstruction unit 220 compares p with P to determine whether all pixels on the reconstructed image have been processed (Step S608).

If p is less than P (Step S608; NO), it is determined that there is an unprocessed pixel, and the image reconstruction unit 220 performs processing on a subsequent pixel, that is, increments p, assigns 1 to 1, assigns 0 to $t_p$ (Step S609) and repeats processing from Step S602.

Meanwhile, if p is more than or equal to P, it is determined that all pixels have been processed (Step S608; YES), the image reconstruction unit 220, next, terminates reconstructed image generation processing.

After that, the digital camera 1 outputs image data of the reconstructed image OB to the display unit 520 in FIG. 1. The image data of the reconstructed image OB may be stored through the I/O unit 510 in FIG. 1 to a recording medium, or may be outputted to other apparatuses.

In the digital camera 1 according to the first embodiment, by photographing using the micro lens array LA, M×N pieces of sub-images can be photographed at the same time as being photographed by one optical device from viewpoints arranged at approximately same intervals in a lattice pattern.

The digital camera 1 uses interpolation images generated by the interpolation image generation apparatus 30 to generate a reconstructed image having less noise than a conventional reconstructed image.

Second Embodiment

Next, a second embodiment of the present invention will be described. The second embodiment is characterized in that a pixel value is added to an interpolation pixel preferentially for an actual pixel whose registered angle θ is large in pixel value addition processing.

The digital camera 1 and interpolation image generation apparatus 30 according to the second embodiment have the same configurations as those of the digital camera 1 according to the first embodiment.

The interpolation image generation apparatus 30 according to the second embodiment performs interpolation image generation processing illustrated in FIG. 12. Here, the interpolation image generation apparatus 30 in the second embodiment performs pixel value addition processing 2, not pixel value addition processing 1 at Step S107 of interpolation image generation processing.

When Step S106 of interpolation image generation processing illustrated in FIG. 12 is completed, the correspondence detection unit 324 starts pixel value addition processing 2.

Pixel value addition processing 2 performed by the correspondence detection unit 324, correspondence evaluation unit 325 and pixel value addition unit 326 will be described with reference to FIG. 20.

In pixel value addition processing 2, first, the correspondence detection unit 324 initializes a variable (Step S701).

That is, the correspondence detection unit 324 assigns 1 to a variable it$_3$ indicating the current number of times of iteration at Step S701, and assigns a maximum value of angles θ registered in an actual pixel information list, as a default value θ$_0$, to a variable θ$_{it3}$ indicating an angle to be processed in the iteration (Step S701).

An actual pixel whose registered angle θ is larger corresponds to an object to be photographed that is closer to the digital camera 1, and is estimated to be an actual pixel to be preferentially added to an interpolation pixel. Therefore, in the second embodiment, by processing an actual pixel whose registered angle θ is large in earlier iteration, only a pixel value of an actual pixel corresponding to an object to be photographed that exists closer is added in an occlusion pixel.

That is, at Step S701, the correspondence detection unit 324 sorts an actual pixel information list illustrated in FIG. 8 in descending order of a registered angle θ (from a larger value). Then, actual pixels registered in the sorted actual pixel information list are subjected to the following processing in series from the top of the list. At this time, a pixel whose angle θ is NULL is excluded.

The total number of times of iteration IT$_3$ of pixel value addition processing 2 is acquired. At this time, IT$_3$ is the number of numerical values registered in the column of an angle θ registered in the actual pixel information list. For example, in the column of an angle θ in the actual pixel information list, five 0s, three 10s and four 20s are registered. At this time, since three numerical values of 0, 10 and 20 are registered in the column of an angle θ, IT$_3$ is three.

When initialization is completed, the correspondence detection unit 324 extracts, an actual pixel whose numerical value in the column of an angle θ is an angle θ$_0$ to be processed in the current iteration, from actual pixels registered in the actual pixel information list (Step S702).

Next, the correspondence detection unit 324 extracts the number P of actual pixels extracted at Step S702 and assigns 1 to a counter variable p$_{it3}$ (Step S703), and numbers the extracted actual pixels with 1 to P.

Then, the correspondence detection unit 324 sets the p$_{it3}$-th actual pixel (pixel p$_{it3}$) of the extracted actual pixels to be actual pixel of interest (Step S704).

Figure 16:
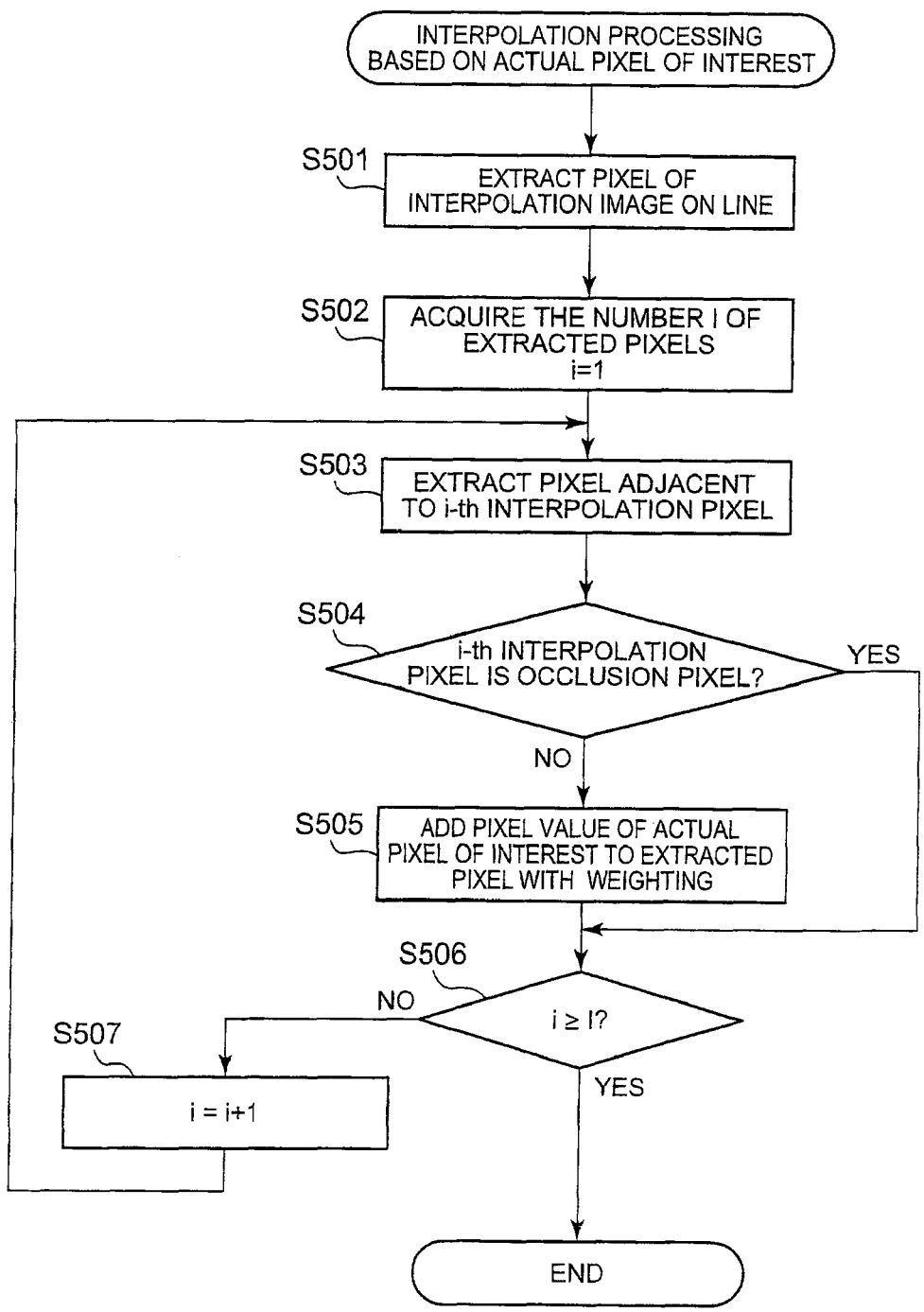
FIG. 16 is a flow chart illustrating an interpolation processing based on an actual pixel of interest according to the first embodiment.

When the correspondence detection unit 324 decides an actual pixel of interest, the correspondence detection unit 324 performs interpolation processing based on an actual pixel of interest illustrated in FIG. 16, as with the first embodiment (Step S705).

When interpolation processing based on an actual pixel of interest (pixel p$_{it3}$) is completed, the correspondence detection unit 324 determines whether there is an unprocessed actual pixel of the pixels extracted at Step S702. Specifically, it is determined whether p$_{it3}$ is more than or equal to P$_{it3}$; if p$_{it3}$ is less than P$_{it3}$ (Step S706; NO), the correspondence detection unit 324 determines that there is an unprocessed actual pixel in the iteration. Then, the correspondence detection unit 324 increments p$_{it3}$ (Step S707) and repeats processing from Step S704 for a subsequent actual pixel as an actual pixel of interest.

Meanwhile, if p$_{it3}$ is more than or equal to P$_{it3}$, it is determined that all actual pixels extracted in the iteration have been processed (Step S706; YES) and the correspondence detection unit 324 terminates the iteration. Then, the correspondence detection unit 324 compares it$_3$ with IT$_3$ to determine whether a predetermined number of times IT$_3$ of iteration have been repeated (Step S708).

If it$_3$ is less than IT$_3$ (Step S708; NO), it is determined that the predetermined number of times of iteration have not been performed, and the correspondence detection unit 324 proceeds to a subsequent iteration.

Specifically, the correspondence detection unit 324 increments it$_3$, assigns θ' to θ$_{it3}$ to perform updating (Step S709) and repeats processing from Step S702.

At this time, θ' is the second largest value after θ$_{it3}$ just before θ' of angles θ registered in the actual pixel information list.

Meanwhile, if it$_3$ is more than or equal to IT$_3$ (Step S708; YES), the correspondence detection unit 324 terminates pixel value addition processing 2.

When pixel value addition processing 2 is completed, the same processing as that of Step S108 in FIG. 12 is performed, interpolation images are generated for all EPIs and the interpolation image generation apparatus 30 terminates interpolation image generation processing. Then, the digital camera 1 uses interpolation images generated by the interpolation image generation apparatus 30 to generate a reconstructed image, as with the first embodiment.

As described above, in the second embodiment, iteration processing is performed in descending order of the largest angle θ in pixel value addition processing 2. At Step S504 in interpolation processing based on an actual pixel of interest in FIG. 16, whether the i-th interpolation pixel is an occlusion pixel or not is determined on the basis of whether a pixel value is added to adjacent interpolation pixels at both sides in the previous iterations.

That is, an interpolation pixel between interpolation pixels corresponding to an actual pixel having a large angle θ (to which a pixel value is added) is determined to be an occlusion pixel, and an a pixel value of an actual pixel having a smaller angle θ is not added to the interpolation pixel.

By using the interpolation image generation apparatus 30 according to the second embodiment, an interpolation image can be generated without adding a pixel value of a pixel that is estimated to hide in an object close to lens to be photographed by an occlusion pixel. Therefore, an interpolation image corresponding to occlusion can be generated from a light field image.

The digital camera 1 according to the second embodiment can generate a reconstructed image having less noise than that of a conventional reconstructed image, by using an interpolation image generated by the interpolation image generation apparatus 30.

<Variation>

The first and second embodiments of the present invention have been described above, but embodiments of the present invention are not limited to these and the following variations can be implemented.

In the first and second embodiments, when a pixel on a straight line is extracted, a pixel whose center point is the closest to an intersection point of the straight line and a pixel array is determined to be on the straight line and the pixel is extracted. However, in the present invention, a method to extract a pixel on a straight line is not limited to this method. As another extraction method, if an intersection point of a straight line and a pixel array is between center points of two pixels, the two pixels can be extracted as the two pixels are deemed to be on the line.

In the first and second embodiments, an angle θ is estimated for each actual pixel. Therefore, for example, if an angle θ is estimated for a pixel 1, an angle θ is again estimated for a pixel 2 that is on Line (θ) of the pixel 1. However, an angle θ registration method according to the present invention is not limited to this, but if an angle θ is estimated for one pixel, the angle θ can be registered at one time for all of pixels on Line (θ) of the pixel. This configuration allows for the angle θ estimation processing at higher speed.

In the above examples, having described that an image is a grayscale image, but an image to be processed in the present invention is not limited to a grayscale image. For example, an image may be an RGB image in which three pixel values of R (red), G (green) and B (blue) are defined for each pixel. In this case, using a vector value of RGB as a pixel value, where a difference between pixel values is calculated, the difference may be found by vector calculation. By using each value of R, G, B as an independent grayscale image, the above processing can be performed. In this configuration, an interpolation image can be generated for a color image, and by using the interpolation image, a reconstructed image having less noise than a conventional reconstructed image can be generated.

In the above examples, the information processing unit 20 and the like are part of the digital camera 1, but the information processing unit 20, storage unit 40 and interface unit 50 may be realized by a physical configuration independent from a digital camera.

In the above examples, the interpolation image generation apparatus 30 is part of the information processing unit 20 of the digital camera 1, but the interpolation image generation apparatus 30 may be realized by a physical configuration independent from the information processing unit 20.

At this time, a light field image LF to be acquired by the interpolation image generation apparatus 30 is not limited to an image obtained by the micro lens array LA of the imaging unit 10. An image to be acquired by the interpolation image generation apparatus 30 may be an image obtained by cameras at the same time from different viewpoints, or an image obtained in series by one camera from different viewpoints.

Disparities between respective sub-images composing a light field image LF may not be the same if information of each image and disparity can be acquired as imaging setting. The interpolation image generation apparatus 30 may have a configuration in which an EPI generated by another apparatus, not a light field image, is acquired and an interpolation image is generated from the EPI.

A main section performing processing for the digital camera 1 that is composed of the information processing unit 20, storage unit 40 and interface unit 50 and the like, or a main section performing processing for the interpolation image generation apparatus 30 that is composed of the information processing unit 320, storage unit 330 and output unit 350 and the like may not be a dedicated system and can be realized by a common computer system. For example, by storing and distributing a computer program for performing the above operation in a computer-readable recording medium (for example, a flexible disc, CD-ROM, DVD-ROM or the like), and installing the computer program in a computer, the information processing unit 320 and interpolation image generation apparatus 30 of the digital camera that perform the above processing may be configured. By storing the computer program in a storage device provided in a server device on a communication network such as the Internet and/or the like and downloading the computer program by a common computer system, the information processing unit 320 and interpolation image generation apparatus 30 may be configured.

Where functions of the information processing unit 20 and interpolation image generation apparatus 30 of the digital camera are realized by dividing the functions to an operating system (OS) and an application program, or by collaborative operation of the OS and application program, only the application program may be stored in a recording medium or a storage device.

It is also possible that a computer program is superimposed on carrier waves and distributed via a communication network. Then, by activating the computer program and executing it as with other application programs under control of the OS, the above processing may be performed.

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the object matter disclosed herein.

What is claimed is:

1. An interpolation image generation apparatus comprising:
   an image acquirer which acquires photographed images in which an object is photographed from viewpoints;
   an actual pixel extractor which (i) extracts, for each of actual pixels composing the photographed images, another actual pixel which is estimated to correspond to a same portion of the object, from pixels in a photographed image other than a photographed image which contains the actual pixel, as a corresponding actual pixel of the actual pixel, and (ii) calculates, for each of the actual pixels, reliability with the extracted corresponding actual pixel thereof;

a model definer which defines a model of an interpolation image corresponding to a new viewpoint which is not included in the viewpoints;

an interpolation pixel extractor which extracts, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;

a determiner which determines whether each of the interpolation pixel candidates corresponds to the actual pixel based on (i) the reliability of the actual pixel or (ii) reliability of an actual pixel corresponding to an interpolation pixel adjacent to the interpolation pixel candidate; and an interpolation image generator which updates a pixel value of an interpolation pixel which was determined to correspond to the actual pixel by the determiner, based on a pixel value of the actual pixel thereby to generate the interpolation image.

2. The interpolation image generation apparatus according to claim 1, wherein the determiner performs determination processing in descending order of the reliability of the actual pixel, and determines whether each of the interpolation pixel candidates corresponds to the actual pixel based on a comparison result of (i) the reliability of the actual pixel and (ii) reliability defined to an actual pixel which is determined to correspond to an interpolation pixel adjacent to the interpolation pixel candidate in previous determination processings.

3. The interpolation image generation apparatus according to claim 1, wherein the determiner performs determination processing in series starting from an actual pixel corresponding to a portion of the object which exists closer to a lens, and determines whether each of the interpolation pixel candidates corresponds to the actual pixel based on a comparison result of (i) the reliability of the actual pixel and (ii) reliability defined to an actual pixel which is determined to correspond to an interpolation pixel adjacent to the interpolation pixel candidate in previous determination processings.

4. The interpolation image generation apparatus according to claim 1, wherein the actual pixel extractor extracts a corresponding actual pixel of each of the actual pixels by detecting a straight line based on an error value indicating a degree of difference between pixel values of actual pixels on the straight line on an epipolar plane image.

5. The interpolation image generation apparatus according to claim 4, wherein the actual pixel extractor uses different detection standards to detect a straight line more than once, and excludes actual pixels on a straight line which has been detected from calculation of an error value in straight line detection in subsequent repetition processings.

6. The interpolation image generation apparatus according to claim 5, wherein the actual pixel extractor sets, as a detection standard to detect the straight line, that the error value is less than or equal to a predetermined threshold value, and increases the threshold value as the straight line detection is repeated.

7. The interpolation image generation apparatus according to claim 5, wherein the actual pixel extractor calculates the reliability of the actual pixel so that the actual pixel on a straight line which is detected in an earlier repetition processing has a higher reliability.

8. The interpolation image generation apparatus according to claim 4, wherein the actual pixel extractor calculates the reliability based on a degree of an angle between (i) the straight line detected by the actual pixel extractor and (ii) a normal line of the epipolar plane image.

9. A reconstructed image generation apparatus comprising:
  an image acquirer which acquires photographed images obtained in such a way that an optical image of an object is formed by a main lens and the optical image is photographed using micro lenses;
  an actual pixel extractor which (i) extracts, for each of actual pixels composing the photographed images, another actual pixel which is estimated to correspond to a same portion of the object, from pixels in a photographed image other than a photographed image which contains the actual pixel, as a corresponding actual pixel of the actual pixel, and (ii) calculates, for each of the actual pixels, reliability with the extracted corresponding actual pixel thereof;
  a model definer which defines a model of an interpolation image corresponding to a new viewpoint which is not included in optical centers of the micro lenses;
  an interpolation pixel extractor which extracts, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;
  a determiner which determines whether each of the interpolation pixel candidates corresponds to the actual pixel based on (i) the reliability of the actual pixel or (ii) reliability of an actual pixel corresponding to an interpolation pixel adjacent to the interpolation pixel candidate;
  an interpolation image generator which updates a pixel value of an interpolation pixel which was determined to correspond to the actual pixel by the determiner, based on a pixel value of the actual pixel thereby to generate the interpolation image; and
  a reconstructor which reconstructs a newly-focused image from the images acquired by the image acquirer and the interpolation image generated by the interpolation image generator; and
  an image information outputter which outputs information on the reconstructed image.

10. A method comprising:
  acquiring photographed images in which an object is photographed from viewpoints;
  extracting, for each of actual pixels composing the photographed images, another actual pixel which is estimated to correspond to a same portion of the object, from pixels in a photographed image other than a photographed image which contains the actual pixel, as a corresponding actual pixel of the actual pixel;
  calculating, for each of the actual pixels, reliability with the extracted corresponding actual pixel;

defining a model of an interpolation image corresponding to a new viewpoint which is not included in the viewpoints;

extracting, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;

determining whether each of the interpolation pixel candidates corresponds to the actual pixel based on (i) the reliability of the actual pixel or (ii) reliability of an actual pixel corresponding to an interpolation pixel adjacent to the interpolation pixel candidate; and updating a pixel value of an interpolation pixel which was determined to correspond to the actual pixel, based on a pixel value of the actual pixel thereby to generate the interpolation image.

11. A non-transitory computer readable recording medium having stored thereon a program that is executable by a computer to cause the computer to perform functions comprising:

acquiring photographed images in which an object is photographed from viewpoints;

extracting, for each of actual pixels composing the photographed images, another actual pixel which is estimated to correspond to a same portion of the object, from pixels in a photographed image other than a photographed image which contains the actual pixel, as a corresponding actual pixel of the actual pixel;

calculating, for each of the actual pixels, reliability with the extracted corresponding actual pixel;

defining a model of an interpolation image corresponding to a new viewpoint which is not included in the viewpoints;

extracting, for each of the actual pixels, interpolation pixel candidates which are estimated to correspond to a portion of the object to which the actual pixel corresponds, from interpolation pixels composing the model of the interpolation image, based on (i) a position of a viewpoint from where the actual pixel was photographed, (ii) a position of a viewpoint from where the corresponding actual pixel of the actual pixel was photographed and (iii) a position of the new viewpoint;

determining whether each of the interpolation pixel candidates corresponds to the actual pixel based on (i) the reliability of the actual pixel or (ii) reliability of an actual pixel corresponding to an interpolation pixel adjacent to the interpolation pixel candidate; and updating a pixel value of an interpolation pixel which was determined to correspond to the actual pixel, based on a pixel value of the actual pixel thereby to generate the interpolation image.

* * * * *